United States Patent
Li

(10) Patent No.: US 12,037,012 B2
(45) Date of Patent: Jul. 16, 2024

(54) ENSEMBLE-BASED VEHICLE MOTION PLANNER

(71) Applicant: Motional AD LLC, Boston, MA (US)

(72) Inventor: Nanxiang Li, Livermore, CA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 18/310,595

(22) Filed: May 2, 2023

(65) Prior Publication Data
US 2024/0124016 A1    Apr. 18, 2024

Related U.S. Application Data

(60) Provisional application No. 63/416,346, filed on Oct. 14, 2022.

(51) Int. Cl.
*B60W 60/00* (2020.01)
*B60W 50/06* (2006.01)
*G01C 21/34* (2006.01)
*G06N 20/20* (2019.01)

(52) U.S. Cl.
CPC .......... *B60W 60/001* (2020.02); *B60W 50/06* (2013.01); *G01C 21/34* (2013.01); *G06N 20/20* (2019.01); *B60W 2420/403* (2013.01); *B60W 2420/408* (2024.01)

(58) Field of Classification Search
None
See application file for complete search history.

(56) References Cited

U.S. PATENT DOCUMENTS

| | | | | |
|---|---|---|---|---|
| 8,170,739 B2 * | 5/2012 | Lee | ........................ | G01C 21/12 701/28 |
| 9,896,101 B2 * | 2/2018 | Kato | .................... | B60W 30/165 |
| 10,046,803 B2 * | 8/2018 | Singh | .................... | B62D 15/028 |
| 10,133,275 B1 * | 11/2018 | Kobilarov | ................ | G06N 3/08 |
| 10,379,538 B1 * | 8/2019 | Sheckells | .............. | B60W 10/20 |
| 10,429,846 B2 * | 10/2019 | Nix | ........................ | G05D 1/0212 |

(Continued)

FOREIGN PATENT DOCUMENTS

CN        113942524        1/2022

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Jonathan M Dager
(74) *Attorney, Agent, or Firm* — Fish & Richardson P.C.

(57) ABSTRACT

Provided are systems, methods, and computer program products for ensemble based vehicle motion planning. A model ensemble including a routing model and multiple planning models may be trained and applied to generate a trajectory for navigating a vehicle in a scenario. In some cases, the routing model may select, from multiple candidate trajectories generated by the planning models based on the scenario, the trajectory generated by the best performing planning model. Alternatively, the routing model may successively activate one or more of the planning models to generate one or more candidate trajectories based on the scenario until the routing model identifies a trajectory satisfying one or more criteria.

28 Claims, 13 Drawing Sheets

(56) References Cited

U.S. PATENT DOCUMENTS

| | | | |
|---|---|---|---|
| 10,481,044 B2* | 11/2019 | Sun | B60W 30/00 |
| 10,522,038 B2* | 12/2019 | Bielby | G08G 1/04 |
| 10,606,277 B2* | 3/2020 | Fan | G08G 1/165 |
| 10,732,632 B2* | 8/2020 | Li | B60W 60/001 |
| 10,816,985 B2* | 10/2020 | Zhang | G05D 1/0214 |
| 10,860,019 B2* | 12/2020 | Censi | B60W 40/10 |
| 10,871,777 B2* | 12/2020 | Jensen | G05D 1/027 |
| 10,956,855 B1* | 3/2021 | Coughran | G06N 20/10 |
| 10,957,201 B2* | 3/2021 | Do | G01C 21/3492 |
| 10,990,102 B2* | 4/2021 | Wei | B62D 15/025 |
| 11,199,847 B2* | 12/2021 | Zhu | G05D 1/0223 |
| 11,318,936 B2* | 5/2022 | Giorelli | B60W 30/10 |
| 11,487,292 B2* | 11/2022 | Kumar | G05D 1/0212 |
| 11,498,563 B2* | 11/2022 | Hirosawa | B60W 10/04 |
| 11,500,380 B2* | 11/2022 | Wray | G08G 1/096708 |
| 11,514,790 B2* | 11/2022 | Grace | H04W 4/44 |
| 2015/0178998 A1* | 6/2015 | Attard | G07C 5/008 |
| | | | 701/23 |
| 2015/0286219 A1* | 10/2015 | Reichel | G08G 1/163 |
| | | | 701/23 |
| 2016/0325753 A1* | 11/2016 | Stein | B60W 50/0097 |
| 2018/0089563 A1* | 3/2018 | Redding | G06N 3/006 |
| 2019/0072965 A1* | 3/2019 | Zhang | G08G 1/167 |
| 2019/0369637 A1* | 12/2019 | Shalev-Shwartz | |
| | | | G01C 21/3415 |
| 2020/0189575 A1* | 6/2020 | Wongpiromsarn | G08G 1/166 |
| 2020/0192391 A1* | 6/2020 | Vora | G05D 1/0088 |
| 2020/0269843 A1* | 8/2020 | Wissing | B60W 30/18163 |
| 2020/0377090 A1* | 12/2020 | Seccamonte | B60W 60/0011 |
| 2021/0300414 A1 | 9/2021 | Yasui et al. | |
| 2021/0312809 A1* | 10/2021 | Priev | G08G 1/166 |
| 2021/0385630 A1* | 12/2021 | Yang | H04W 4/12 |
| 2022/0018668 A1* | 1/2022 | Klein | G01C 21/3469 |
| 2022/0081000 A1 | 3/2022 | Jiang et al. | |
| 2022/0126876 A1* | 4/2022 | Tebbens | B60W 30/18163 |
| 2022/0169278 A1 | 6/2022 | Feraat et al. | |
| 2022/0332350 A1* | 10/2022 | Jha | B60W 60/0017 |
| 2023/0005366 A1* | 1/2023 | Yu | G08G 1/165 |
| 2023/0037071 A1* | 2/2023 | Cunningham | B60W 60/001 |
| 2023/0058086 A1* | 2/2023 | Vassilovski | B60W 60/001 |
| 2023/0084578 A1* | 3/2023 | Sadeghi | B60W 60/001 |
| | | | 701/23 |
| 2023/0182754 A1* | 6/2023 | Dong | B60W 40/02 |
| | | | 701/26 |
| 2023/0221128 A1* | 7/2023 | Collin | B60W 60/001 |
| | | | 701/25 |

OTHER PUBLICATIONS

International Search Report and Written Opinion in International Appln. No. PCT/US2023/034739, dated Jan. 25, 2024, 18 pages.

* cited by examiner

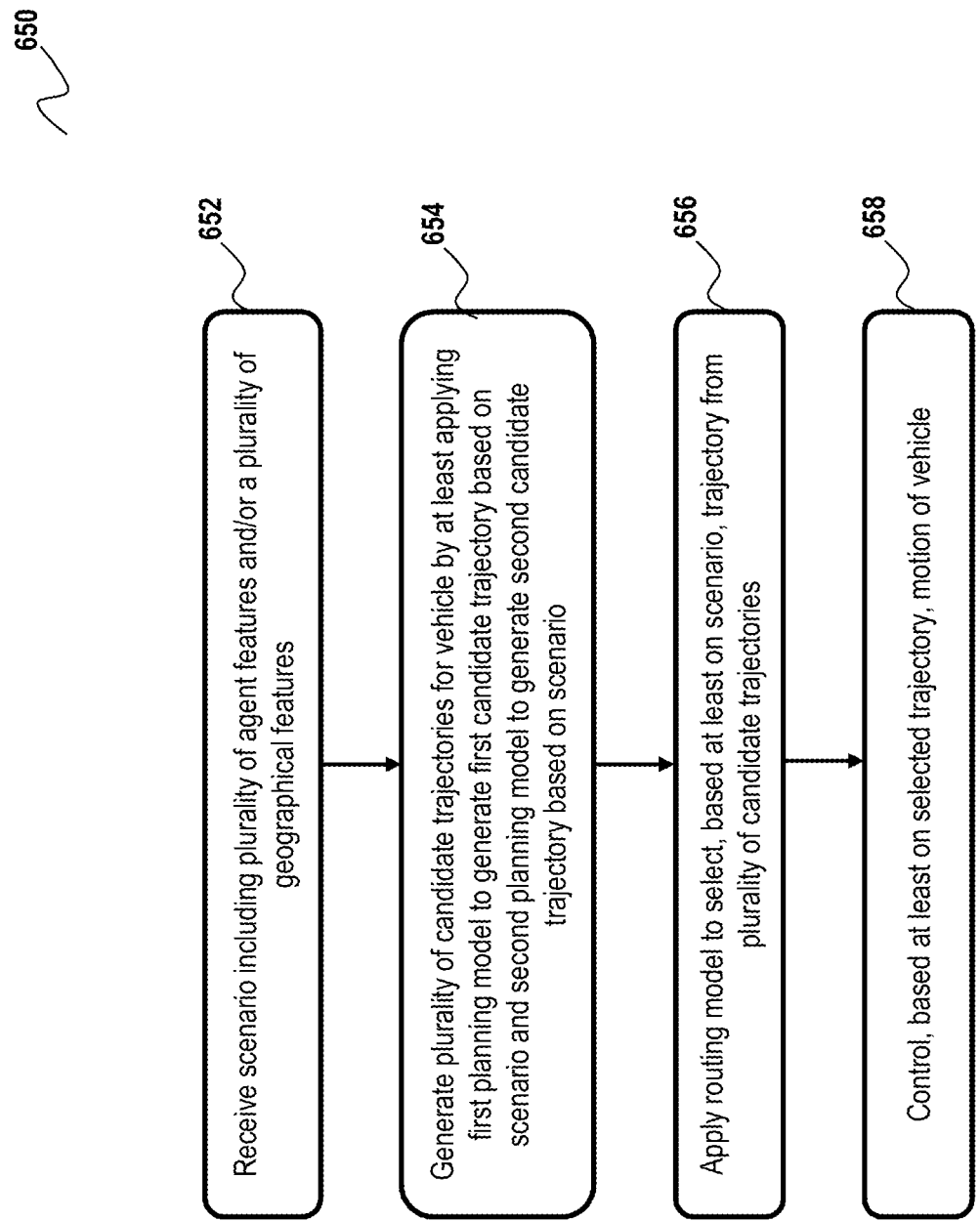

ENSEMBLE-BASED VEHICLE MOTION PLANNER

CROSS-REFERENCE TO RELATED APPLICATION

This application claims the benefit of priority from U.S. Provisional Application No. 63/416,346, filed on Oct. 14, 2022, and entitled, "COORDINATED MACHINE LEARNING ENSEMBLE FOR MOVEMENT PLANNING," the contents of which are hereby fully incorporated by reference.

BACKGROUND

An autonomous vehicle is capable of sensing and navigating through its surrounding environment with minimal to no human input. To safely navigate the vehicle along a selected path, the vehicle may rely on a motion planning process to generate, update, and execute one or more trajectories through its immediate surroundings. The trajectory of the vehicle may be generated based on the current condition of the vehicle itself and the conditions present in the vehicle's surrounding environment, which may include mobile objects such as other vehicles and pedestrians as well as immobile objects such as buildings and street poles. For example, the trajectory may be generated to avoid collisions between the vehicle and the objects present in its surrounding environment. Moreover, the trajectory may be generated such that the vehicle operates in accordance with other desirable characteristics such as path length, ride quality or comfort, required travel time, observance of traffic rules, adherence to driving practices, and/or the like.

BRIEF DESCRIPTION OF THE FIGURES

FIG. 6B is a flowchart illustrating another example of a process for ensemble based vehicle motion planning.

DETAILED DESCRIPTION

Figure 1:
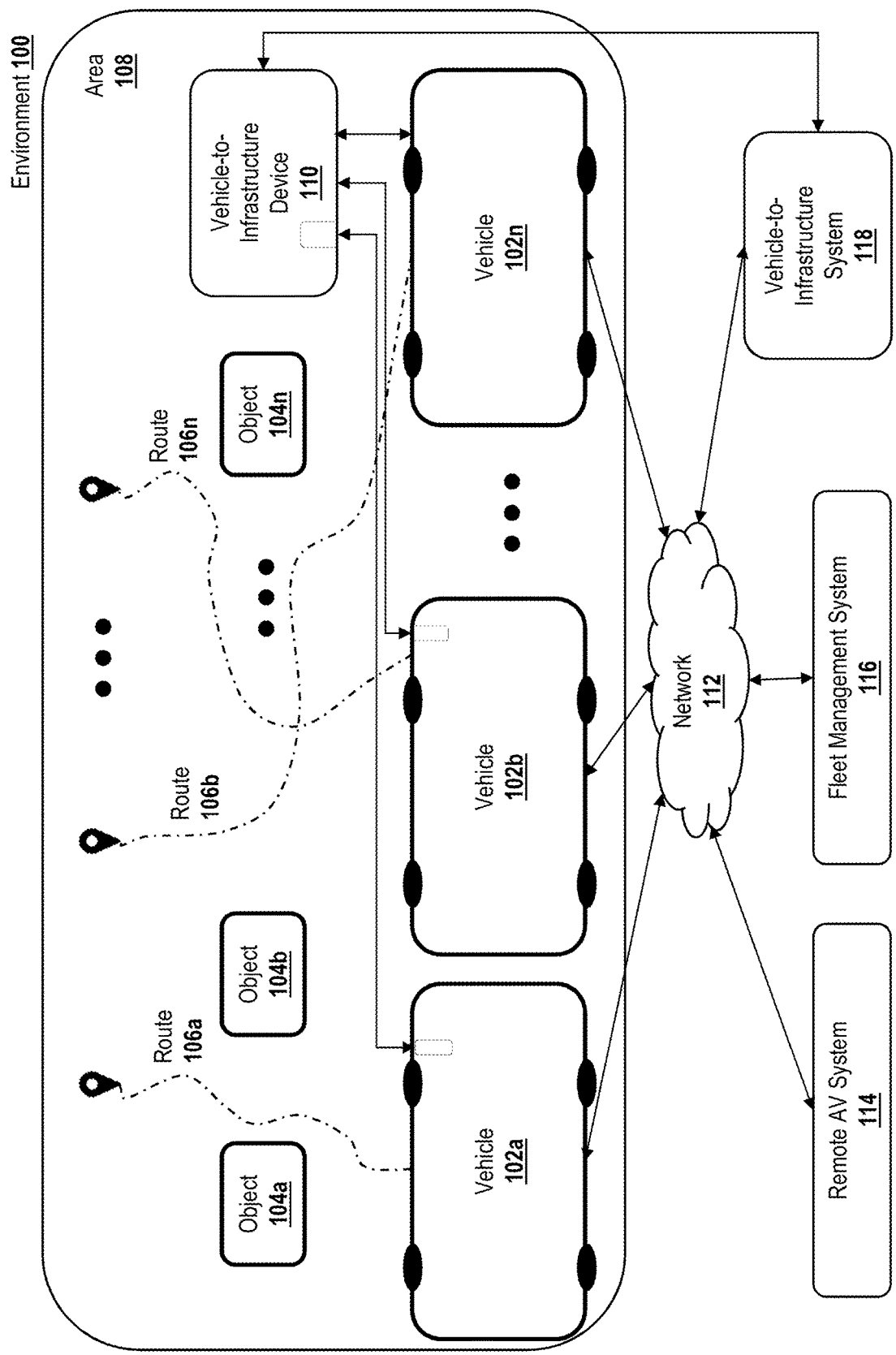
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement techniques for generating trajectories for navigating a vehicle in a variety of scenarios, including infrequent scenarios for which training samples are few or even nonexistent. In particular, to generate a trajectory for a scenario encountered by a vehicle (e.g., an autonomous vehicle and/or the like), a motion planning system may apply a model ensemble in which a routing model selects the trajectory generated by the best performing planning model amongst multiple planning models in the model ensemble.

In some cases, the different planning models may exhibit difference performance due to a variety of factors. For example, the model ensemble may include planning models that are based on different machine learning architectures. Alternatively and/or additionally, the model ensemble may include planning models that have undergone different training including, for example, different initial parameters (e.g., weights, biases, and/or the like), different training data (e.g., different sets of training scenarios and/or the like), different convergence criteria, and/or the like. Accordingly, some planning models may exhibit better performance for certain scenarios than other planning models. For example, a first planning model may exhibit better performance than a second planning model for a first set of scenarios while the second planning model may exhibit better performance than the first planning model for a second set of scenarios. That different planning models may excel at different scenarios may be leveraged to maximize the performance of the model ensemble across the gamut of scenarios including infrequent scenarios, which tends to be error prone due to the dearth of training data associated with such scenarios. Examples of infrequent, error-prone scenarios include crosswalks, left turns, roundabouts, limited visibility conditions, railroad crossings, and construction zones.

Particularly in the case of infrequent scenarios for which there is a dearth of training data for training any of the planning models in the model ensemble, some planning models may still exhibit better performance than other planning models even though those planning models have little to no exposure to these infrequent scenarios. For example, a planning model trained to make left-hand turns at intersections may perform better in a U-turn scenario than another planning model trained to make right-hand turns, for example, because agent movements and other considerations are more similar between U-turn scenarios and left-hand turn scenarios than right-hand turn scenarios. As another example, a planning model trained with crosswalk scenarios may perform better for school zones than another planning model trained with construction zone scenarios.

As noted, in some example embodiments, the model ensemble may include a routing model trained to identify the best performing planning model in different scenarios. In instances where the model ensemble is trained to perform a two-stage process for generating vehicle trajectories, the routing model may ingest, as input, a scenario and a plurality of candidate trajectories generated by different planning models for the scenario before generating an output identifying the best performing one of the planning models for the scenario. Alternatively, in cases where the model ensemble is trained to perform an end-to-end process for generating vehicle trajectories, the routing model may successively activate one or more of the planning models to generate one or more candidate trajectories based on a scenario until the routing model identifies a trajectory satisfying one or more criteria. In this context, the performance of a planning model may be quantified based on a difference (e.g., an average displacement error (ADE) and/or the like) between the trajectory generated by the planning model for a scenario and an ideal trajectory for the scenario. During training, the ideal trajectory for the scenario may be a ground-truth trajectory for that scenario. As such, training the routing model may include training the routing model to recognize how much a candidate trajectory for a scenario deviates from an ideal trajectory for that scenario such that at inference time, the routing model is able to determine when the candidate trajectory a planning model generated for a scenario is satisfactory (e.g., sufficiently similar to the ideal trajectory for the scenario) or is the best one of the candidate trajectories generated by the planning models (e.g., most similar to the ideal trajectory for the scenario).

The use of a model ensemble for motion planning has several advantages. For example, the inclusion of multiple planning models, with at least some planning models being capable of providing a performance advantage in certain scenarios than other planning models, may improve overall motion planning performance across a gamut of scenarios including infrequent scenarios that tend overwhelm individual planning models. In some cases, for example, leveraging multiple planning models may enable the model ensemble to generate trajectories that are more likely to avoid collisions between the vehicle and the objects present in its surrounding environment as well as satisfy various desirable characteristics such as path length, ride quality or comfort, required travel time, observance of traffic rules, adherence to driving practices, and/or the like Moreover, in some cases, overall motion planning performance may improve with a greater diversity of planning models in the model ensemble. Contrastingly, a single planning model cannot always be trained to respond to multiple scenarios with sufficient performance. That is, in some cases, once a planning model has been trained to respond to a first set of scenarios, further training the same planning model to also respond to a second set of scenarios may diminish the planning model's performance for the first set of scenarios and/or the second set of scenarios. For example, training a single planning model to generate trajectories in U-turn scenarios can cause the planning model to overshoot the proper factor weighting of the speed of approaching vehicles for left-hand turns at an intersection. In another example, training a single planning model to generate trajectories for U-turn scenarios can cause the planning model to overshoot the proper factor weighting of vehicle behavior of vehicles making right-hand turns onto the target road for the U-turn.

Training a model ensemble can also be more efficient and modular than training individual planning models. For example, a single planning model may require continuous updates when new scenarios are encountered. However, as noted, once the planning model is trained to respond to a first set of scenarios, further updates to train the planning model to also respond to a second set of scenario may diminish the performance of the planning model for the first set of scenarios and/or the second set of scenarios. Efforts to detect this phenomenon may require the updated planning model to be validated again for the first set of scenarios. The repeated testing and validation of the planning model to cover new scenarios can be costly and inefficient. Not only is this validation process inefficient and costly, but behavior changes in the planning model engendered by further updates can cause difficulties in rebalancing the factor weighting or, worse, necessitate a complete re-training of the planning model. In contrast, the model ensemble can take a modular training approach. When one of the planning models is updated, the behavior of the planning models in the ensemble remain unaffected. Any further testing and performance validation required for the updated planning model is much less time-consuming and costly. This feature enables the model ensemble to adapt to new scenarios, including infrequent scenarios, more quickly and efficiently than any individual planning models.

Other technical problems for a single machine learning model include proper factor weighing as the vehicle transitions from typical driving scenarios to infrequent scenarios. For example, a single planning model trained based on a first set of scenarios (e.g., scenarios encountered in a first geographic location) might place too much or too little weight on certain vehicle movements as the vehicle approaches an intersection in a second set of scenarios (e.g., scenarios encountered in a second geographic location). This behavioral difference may arise due to differences, for example, in the weather conditions or street design that are prevalent in the different sets of scenarios. Nevertheless, once the planning model is trained for the first set of scenarios, the factor weighting for other vehicle movements may become misaligned for the second set of scenarios. This misalignment potentially causes unpredictable effects on a planning system's ability to safely continue navigation in the second set of scenarios. Without a model ensemble with additional planning models, the factor weighing for that one planning model can become skewed or misaligned for across a multitude of scenarios, leading to potentially unforeseeable and dangerous decisions.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
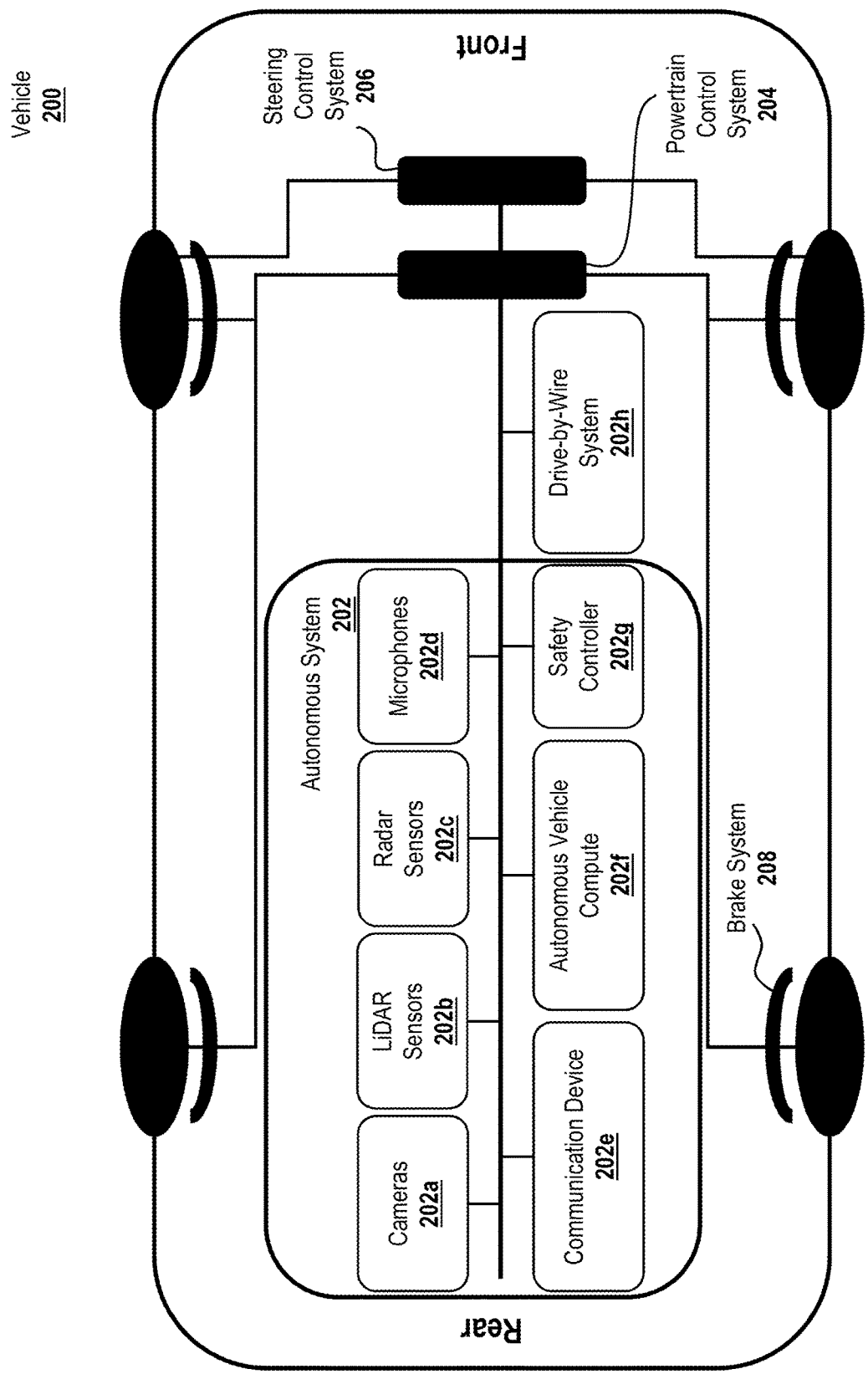
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operation or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
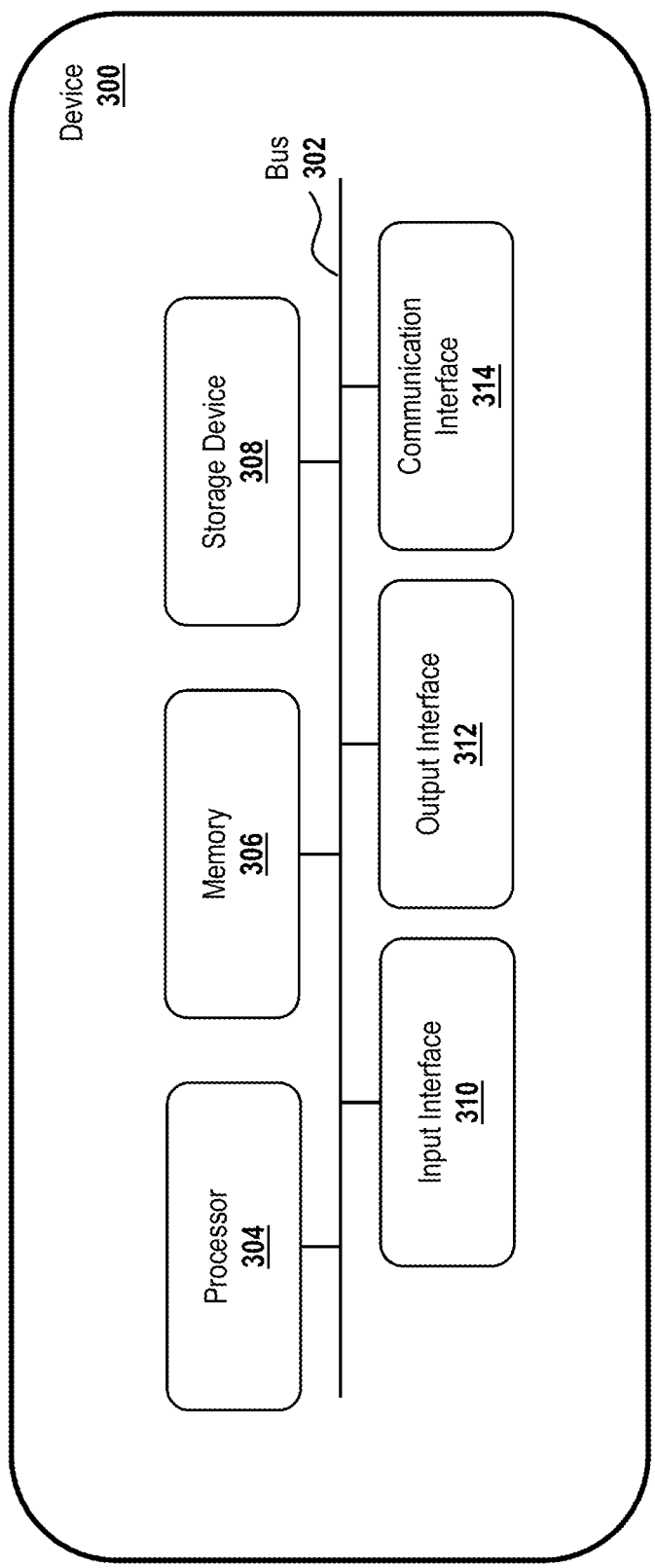
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charged-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
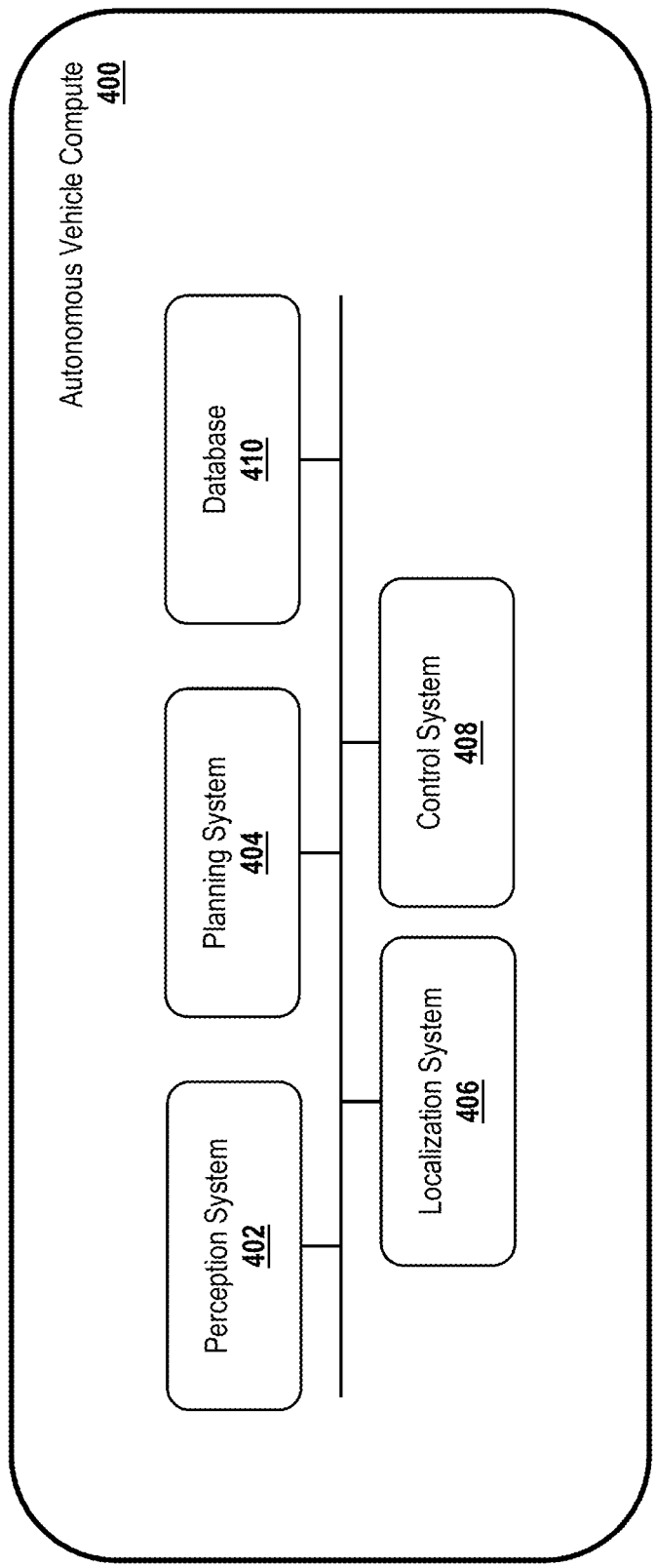
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
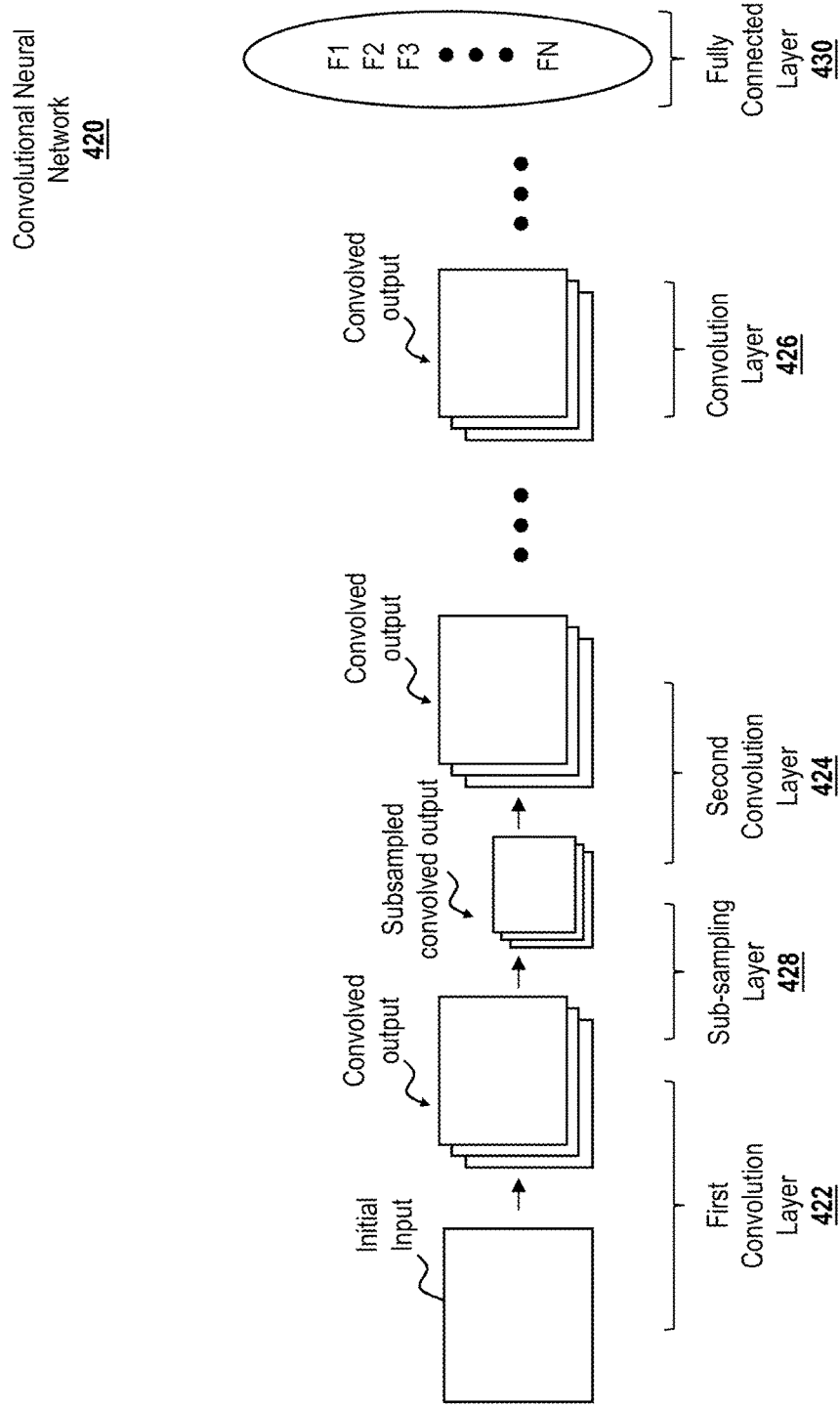
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 ... FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, ... FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
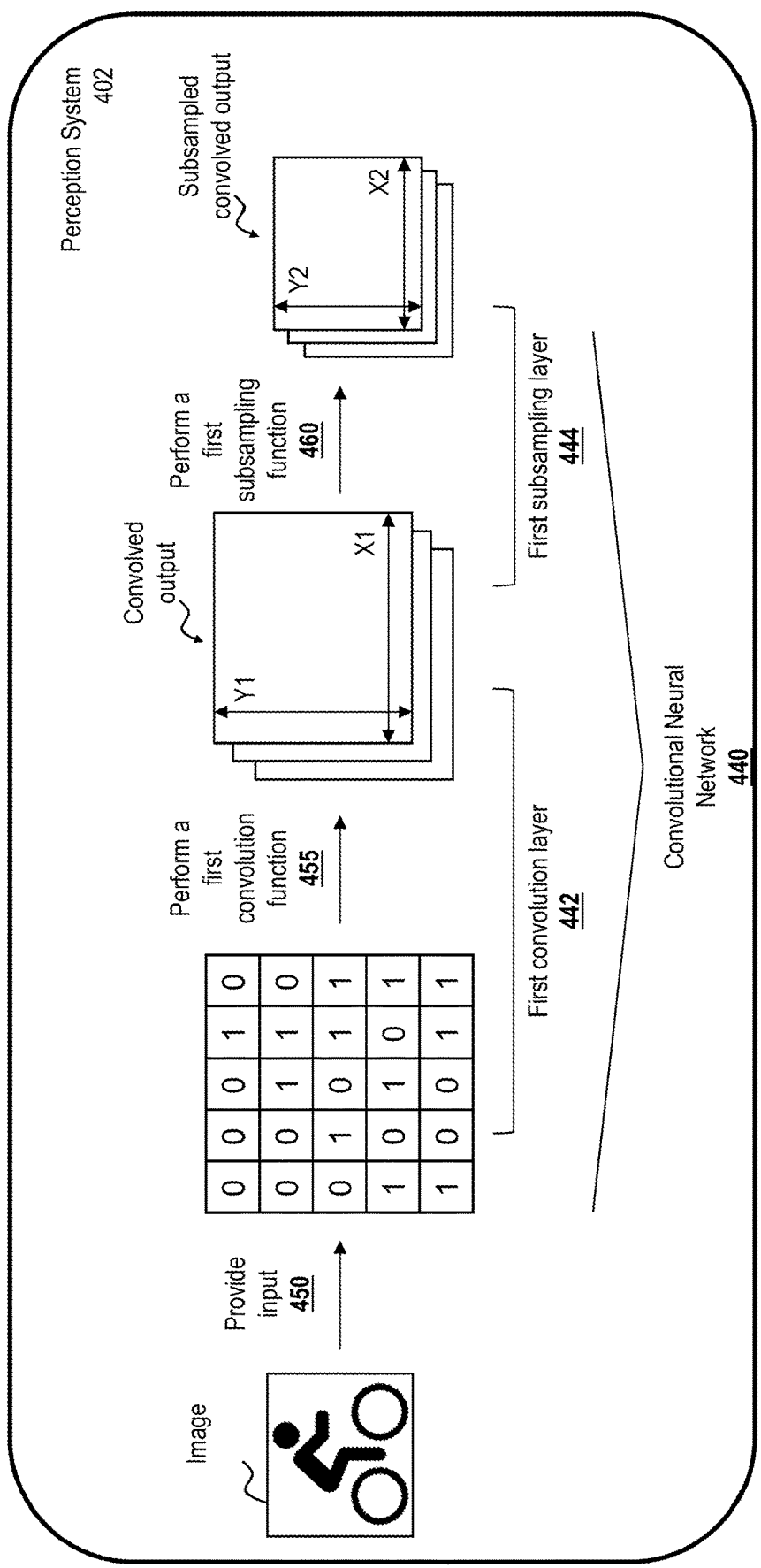
FIGS. 4C and 4D are a diagram illustrating example operation of a CNN.
Figure 4D:
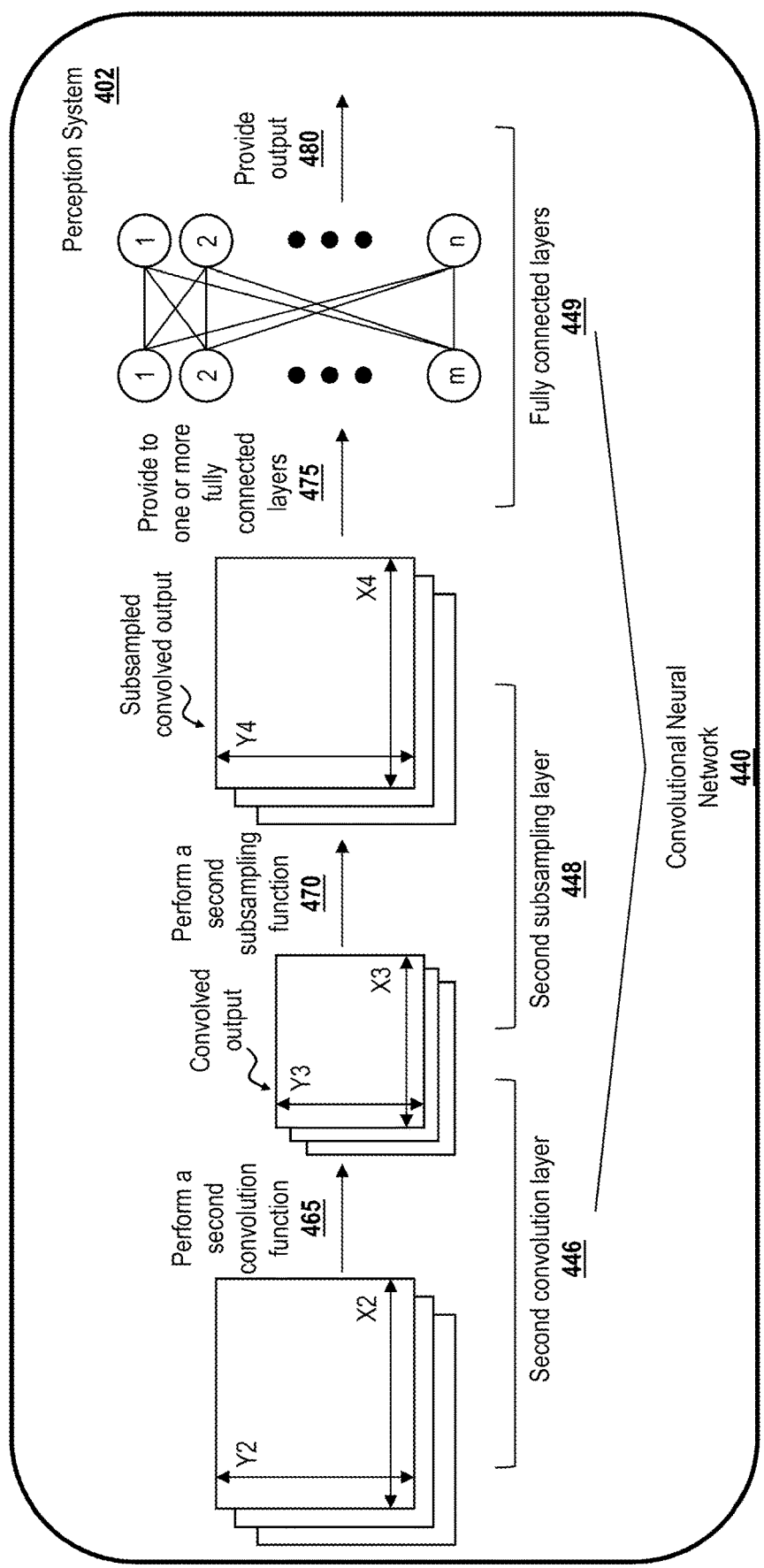

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 4E:
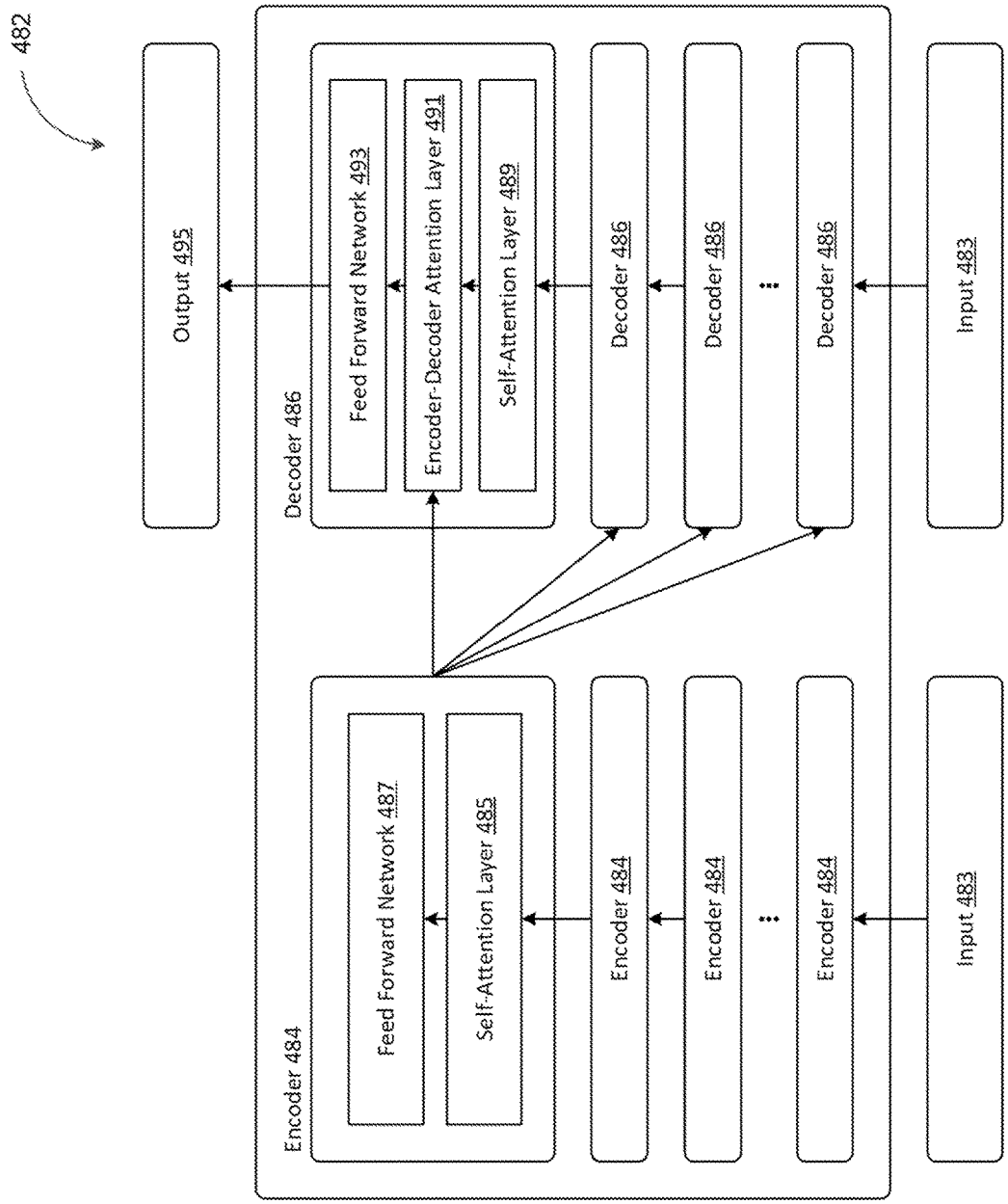
FIG. 4E is a diagram of an implementation of a transformer model.

Referring now to FIG. 4E, illustrated is a diagram of an implementation of a machine learning model. More specifically, illustrated is a diagram of an implementation of a transformer model 482. In some example embodiments, the transformer model 482 may implement the perception system 402, the planning system 404, the localization system 406, and/or control system 408. As will be described in more detail, the transformer model 482 may include a self-attention mechanism to capture the relative significance and relationship between different portions of an input 483. For instance, in cases where the input 483 is an image (e.g., of the environment proximate to a vehicle), the self-attention mechanism of the transformer model 482 may capture the relative significance and relationship amongst different portions (or patches) of the image when generating an output 495 that includes, for example, one or more labels classifying one or more objects present in the image. While the transformer model 482 includes certain features as described herein, these features are provided for the purpose of illustration and are not intended to limit the present disclosure.

As shown in FIG. 4E, the transformer model 482 may include an encoder stack having a plurality of encoders 484 (or encoding layers) coupled with a decoder stack having a plurality of decoders 486 (or decoding layers). In the example shown in FIG. 4E, the input 483 (e.g., the embedding of each individual portion of the input 483) flows through successive encoders 484, with the output of the final encoder 484 being passed to every decoder 486 in the decoder stack. For example, in some cases, each encoder 484 in the encoder stack may generate an encoding that contains information about which parts of the input 483 are relevant to each other. Moreover, the output of one encoder 484 may be passed on as an input to the next encoder 484 in the encoder stack. Accordingly, in some cases, the first encoder 484 in the encoder stack may generate a first encoding of the input 483 (e.g., the embedding of each individual portion of the input 483) while the next encoder 484 in the encoder stack may generate a second encoding of the first encoding.

As shown in FIG. 4E, in some cases, each encoder 484 may include self-attention layer 485 and a feed-forward network 487. Each portion of the input 483 (e.g., each embedded portion of the input 483) may flow through its own path in the encoder 484, with the self-attention layer 485 determining the relationship (or association) between each individual portion of the input 483. For example, in cases where the input 483 is an image, the self-attention layer 485 may determine the relationship between different portions (or patches) of the image. In doing so, the self-attention layer 485 enables the encoder 484 to generate a context-aware encoding of the input 483 where the encoding for each individual portion of the input 483 incorporates weighted values corresponding to the other portions of the input 483. For instance, in some cases, the encoding for a first portion of the input 483 (e.g., a first embedding of the first portion of the input 483) may be generated to incorporate a first value corresponding to a second portion of the input 483 and a second value corresponding to a third portion of the input 483, with the first value and the second value being weighted to reflect how much the second portion and the third portion of the input 483 should affect the encoding for the first portion of the input 483. In some cases, the self-attention layer 485 may include a multi-headed attention mechanism, with each head applying a different set of weights (e.g., query, key, and value weight matrices) for incorporating the other portions of the input 483. It should be appreciated that the weights (e.g., query, key, and value weight matrices) applied by the self-attention layer 485 may be learned during the training of the transformer model 482.

Referring again to FIG. 4E, the decoder stack may decode the input 483 to generate the output 495 based on attention vectors output by the final encoder 484 in the encoder stack, with each decoder 486 in the decoder stack successively decoding the output of the previous decoder 486. For example, the first decoder 486 in the decoder stack may generate a first decoding of the input 483 (e.g., the embedding of each individual portion of the input 483) while the next decoder 486 in the decoder stack may generate a second decoding of the first decoding. As shown in FIG. 4E, each decoder 486 may include a self-attention layer 489, an encoder-decoder attention layer 491, and a feed forward network 493. The self-attention layer 489 of the decoder 486 may enable the decoder 486 to generate a context-aware decoding of the input 483 where the decoding for each individual portion of the input 483 incorporates weighted values corresponding to one or more preceding portions of the input 483. Meanwhile, the encoder-decoder attention layer 491 may determine, based at least on the attention vectors output by the final encoder 484 of the encoder stack, weighted values indicative of the relative significance of each corresponding portion of the input 483.

Figure 5:
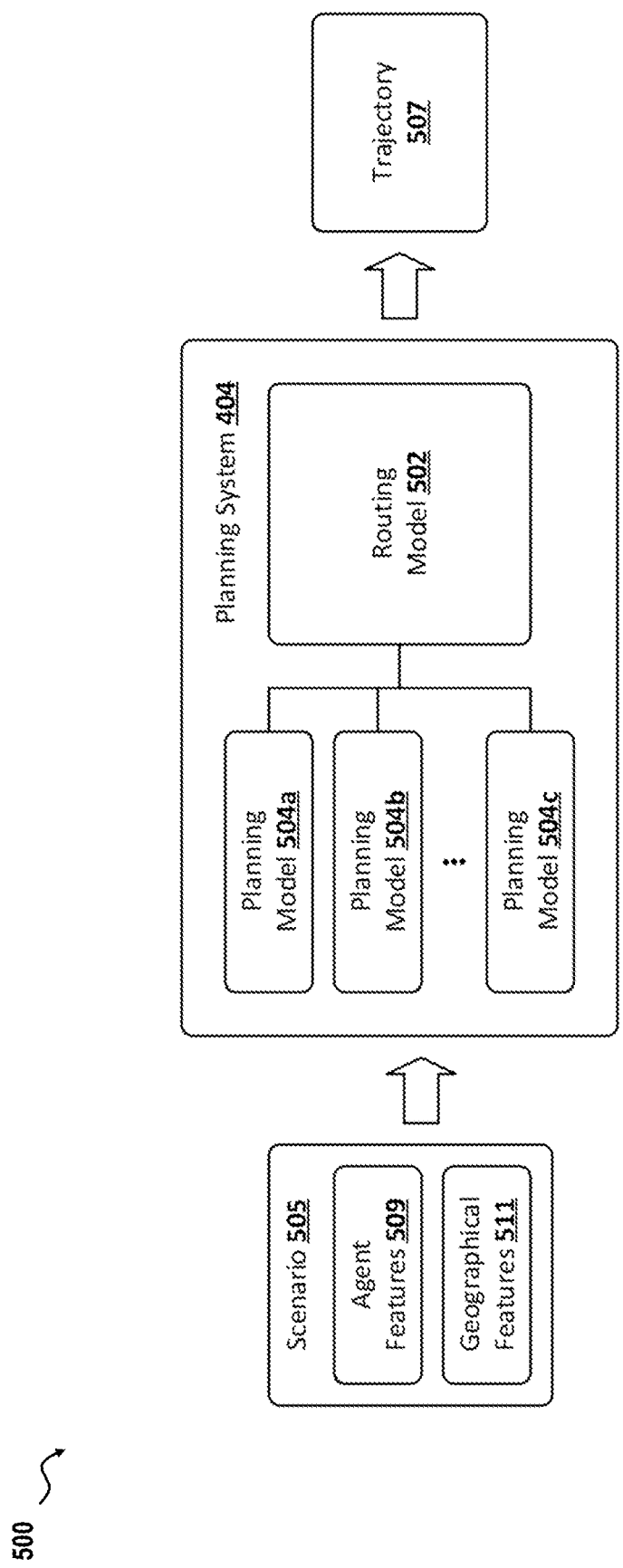
FIG. 5 is a block diagram of an implementation of a system for vehicle motion planning.

Referring now to FIG. 5, illustrated is a diagram of an implementation 500 of a system for vehicle motion planning in which a trajectory 507 for navigating a vehicle in a scenario 505 is selected from multiple trajectories generated by an ensemble of planning models. In some embodiments, implementation 500 includes an example of the planning system 404 with a model ensemble that includes a routing model 502 and planning models 504 (e.g., a first planning model 504*a*, a second planning model 504*b*, a third planning model 504*c*, and/or the like). In some cases, the routing model 502, the first planning model 504*a*, the second planning model 504*b*, and/or the third planning model 504*c* may be machine learning models. Examples of machine learning model architectures are described above with respect to FIGS. 4B-4E.

In some example embodiments, the planning system 404 may include the ensemble of planning models 504*a-c* at least because any individual one of the planning models 504*a-c* may be unable to provide adequate performance across the gamut of scenarios encountered by a vehicle (e.g., an autonomous vehicle such as vehicles 102*a*-102*n*, vehicles 200, and/or the like). A variety of factors may contribute to differences in the performance of the first planning model 504*a*, the second planning model 504*b*, and the third planning model 504*c*. For example, the first planning model 504*a*, the second planning model 504*b*, and the third planning model 504*c* may have different machine learning architectures. Alternatively and/or additionally, the first planning model 504*a*, the second planning model 504*b*, and the third planning model 504*c* may have undergone different training including, for example, being initialized with different parameters (e.g., weights, biases, and/or the like) at the start of training, being exposed to different training data during training, being subjected to difference convergence criteria at the end of training, and/or the like. These factors may also prevent any single one of the planning models 504*a-c* from being trained to perform well across the gamut of scenarios encountered by the vehicle. In some cases, training a single one of the planning models 504*a-c* to achieve adequate performance for one set of scenarios may in turn diminish the performance of the model for other scenarios.

In some example embodiments, instead of relying on a single one of the planning models 504*a-c* to generate trajectories for every scenario encountered by the vehicle, the routing model 502 may select the trajectory generated by the best performing one of the planning models 504*a-c* for each scenario. For instance, in the example shown in FIG. 5, the routing model 502 may select the trajectory that is best suited for navigating the vehicle in an environment defined by a plurality of agent features 509 (e.g., including features of the vehicle itself) and/or geographical features 511 (e.g., lanes, road features, and/or the like) included in the scenario 505. In some cases, the planning system 404 may receive data corresponding, for example, to the scenario 505 from the perception system 402 and/or the localization system 406 before generating and outputting the corresponding trajectory 507 for ingestion by the control system 408. For those scenarios where the first planning model 504*a* exhibits better performance than the second planning model 504*b* and/or the third planning model 504, the routing model 502 may select the first trajectory generated by the first planning model 504*a* for navigating the vehicle instead of a second trajectory generated by the second planning model 504*b* and/or a third trajectory generated by the third planning model 504*c*. Meanwhile, for other scenarios where the second planning model 504*b* outperforms the first planning model 504*a* and/or the third planning model 504*b*, the routing model 502 may select the second trajectory generated by the second planning model 504*b* when the vehicle encounters those scenarios. In doing so, the routing model 502 may maximize the performance of the planning system 404 across a variety of scenarios, including infrequent scenarios (e.g., scenarios identified as accounting for less than 1% of all scenarios encountered by the vehicle) for which training samples are scarce or even nonexistent.

In some example embodiments, the performance of each of the planning models 504*a-c* in a particular scenario, such as the scenario 505, may be evaluated based on a performance metric quantifying a difference between the trajectory generated by each of the planning models 504*a-c* and a ground-truth trajectory for the scenario 505. Average displacement error (ADE) is one example of a performance metric. In some cases, average displacement error (ADE) may correspond to the average of the root mean squared error (RMSE) between corresponding vehicle positions in the ground truth trajectory and a trajectory generated by one of the planning models 504*a-c* at each waypoint within the timeframe covered by the trajectories (e.g., 50 waypoints for 5-second timeframe at a 10 hertz sampling rate). Accordingly, in some cases, a lower average displacement error (ADE) may indicate a better performing planning model.

In some example embodiments, the routing model 502 and the planning models 504*a-c* may implement a two-stage process in which the routing model 502 and the planning models 504*a-c* are trained separately to generate, for example, the trajectory 507 for the scenario 505. For example, in some cases, the routing model 502 may be a multi-class classifier whose output is a one-hot-encoded vector in which each element corresponds to one of the planning models 504*a-c*. The element in the one-hot-encoded vector corresponding to the best performing planning model may be set to a first value (e.g., "1") whereas the other elements in the one-hot-encoded vector may be set to a second value (e.g., "0").

As a part of training for this two-stage process, each of the planning models 504*a-c* may be trained to generate trajectories for a variety of training scenarios. For example, in some cases, the planning models 504*a-c* may be trained such that the average displacement error (ADE) between the trajectories output by each of the planning models 504*a-c* and the corresponding ground-truth trajectories satisfies one or more thresholds. Furthermore, in some cases, training for this two-stage process may also include training the routing model 502 to select the best performing planning model from the planning models 504*a-c*. To do so, each of the planning models 504*a-c* may be applied to generate a different trajectory for a training scenario associated with a ground truth trajectory. In order to identify the best performing planning model for the training scenario, a separate performance metric (e.g., average displacement error (ADE) and/or the like) may be determined for each of the planning models 504*a-c* based on a comparison between the ground-truth trajectory and the trajectory generated by each of the planning models 504*a-c*. A training sample for the routing model 502 may be generated to include the training scenario, the trajectories output by the planning models 504*a-c*, and a ground-truth output identifying the best performing planning model (e.g., the one of the planning models 504*a-c* with the lowest average displacement error (ADE)). The routing model 502 may then be trained to determine, based at least on the training sample, the best performing planning model for the training scenario. For instance, in some cases, the training of the routing model 502 may include adjusting the routing model 502 such that the output of the routing model 502 identifies the same best performing planning model as the ground-truth output. In some cases, the adjusting of the routing model 502 may include adjusting the weights and/or biases applied by the routing model 502 to minimize a loss function quantifying a difference between the output of the routing model 502 and the ground-truth output.

Figure 6A:
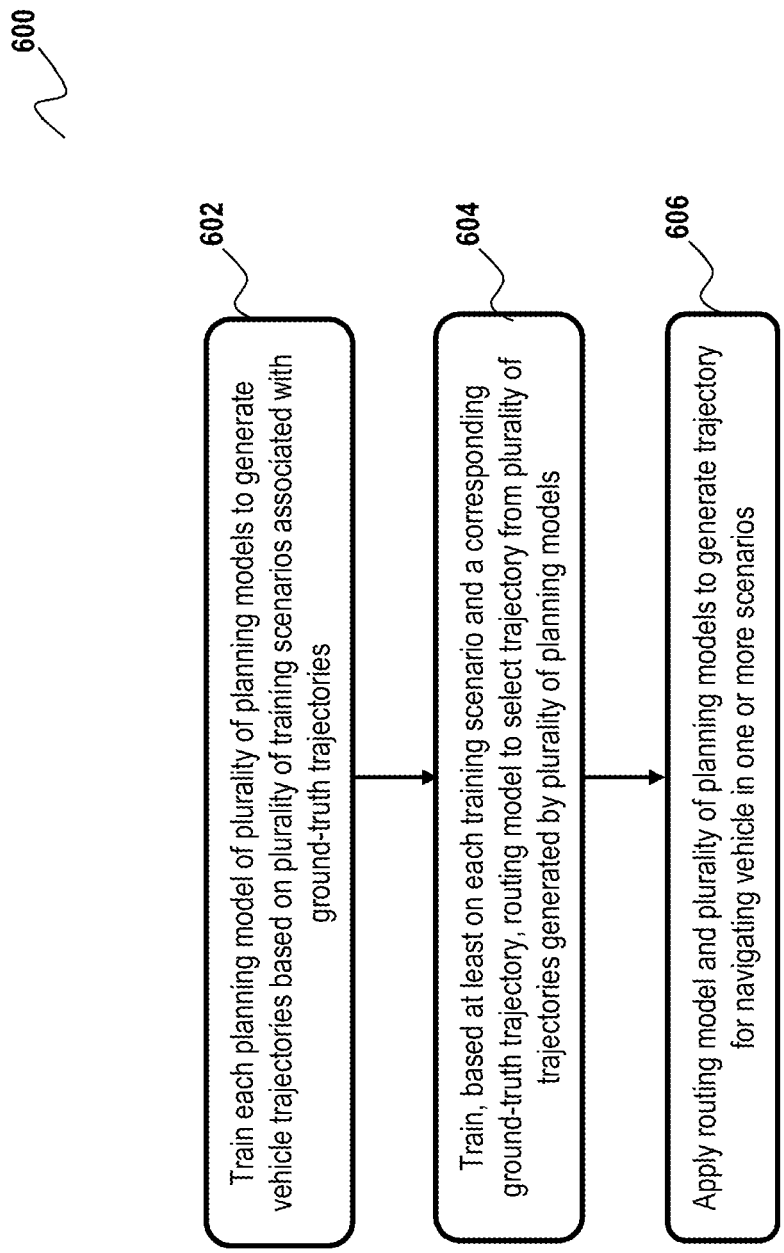
FIG. 6A is a flowchart illustrating an example of a process for ensemble based vehicle motion planning.

Referring now to FIG. 6A, which depicts a flowchart illustrating an example of a process 600 for training a model ensemble to perform vehicle motion planning. In some embodiments, one or more of the operations described with respect to process 600 may be performed (e.g., completely, partially, and/or the like) offline, for example, at the vehicle-to-infrastructure device 110, the remote AV system 114, the fleet management system 116, and/or the vehicle-to-infrastructure system 118, to train a model ensemble including the routing model 502 and the planning models 504*a-c*. In some cases, upon being trained, at least a portion of the model ensemble including the routing model 502 and the planning models 504*a-c* may be deployed to the planning system 404 of a vehicle (e.g., an autonomous vehicle such as vehicles 102*a*-102*n*, vehicles 200, and/or the like) to generate one or more trajectories for the vehicle to navigate various scenarios encountered by the vehicle (e.g., the trajectory 507 for the scenario 505).

At 602, each planning model of a plurality of planning models may be trained to generate vehicle trajectories based on a plurality of training scenarios associated with ground-truth trajectories. In some example embodiments, each of the planning models 504*a-c* may be trained separately to generate trajectories for navigating a vehicle (e.g., an autonomous vehicle such as vehicles 102*a*-102*n*, vehicles 200, and/or the like) in a variety of scenarios. In some cases, the planning models 504*a-c* may be based on different machine learning architecture. Alternatively and/or additionally, the planning models 504*a-c* may be trained based on different training data including, for example, different training scenarios. For example, in some cases, the first planning model 504*a* may determine the trajectory of a vehicle in a scenario based at least on an interaction between a plurality of agents while located relative to one or more lanes present in the scenario whereas the second planning model 504*b* may determine the trajectory of the vehicle based at least on an interaction between the plurality of agents and the one or more lanes while the plurality of agents are located relative to the one or more lanes. Accordingly, the trained planning models 504*a-c* may be capable of responding to a greater variety of scenarios than any single one of the planning models 504*a-c* alone. For instance, in cases where the first planning model 504*a* is unable to generate a satisfactory trajectory for a scenario (e.g., a trajectory whose average displacement error (ADE) satisfies one or more thresholds), the second planning model 504*b* and/or the third planning model 504*c* may be able to generate a satisfactory trajectory for the scenario.

In some cases, the training data for training the planning models 504*a-c* may include a plurality of training scenarios, each of which being associated with a ground-truth trajectory. Accordingly, the training of the first planning model 504*a* may include adjusting the parameters (e.g., weights, biases, and/or the like) of the first planning model 504*a* to minimize the difference (e.g., the average displacement error (ADE) and/or the like) between the trajectory generated by the first planning model 504*a* for each of a first plurality of training scenarios and the corresponding ground-truth trajectory. As noted, in some cases, the second planning model 504*b* and/or the third planning model 504*c* may be based on different machine learning architectures than the first planning model 504*a*. Furthermore, in some cases, the second planning model 504*b* and/or the third planning model 504*c* may have undergone different training than the first planning model 504*a* including, for example, different initial parameters, different training data (e.g., different sets of training scenarios), different convergence criteria, and/or the like. In some cases, the training of the second planning model 540*b* may include adjusting the parameters (e.g., weights, biases, and/or the like) of the second planning model 504*b* to minimize the difference (e.g., the average displacement error (ADE) and/or the like) between the trajectory generated by the second planning model 504*b* for each of a second plurality of training scenarios and the corresponding ground-truth trajectory.

At 604, a routing model may be trained, based at least on each training scenario and a corresponding ground-truth trajectory, to select a trajectory from the plurality of trajectories generated by the plurality of planning models. In some example embodiments, the routing model 502 may be trained separately from the planning models 504*a-c*. For example, in some cases, the routing model 502 may be trained to select the best performing one of the planning models 504*a-c* for each of the training scenarios. Accordingly, in some cases, the training data for training the routing model 502 may include at least a portion the training scenarios used to train the planning models 504*a-c*. Moreover, each training scenario used for training the planning models 504*a-c* may be associated with a ground-truth output identifying the best performing model for the training scenario. For instance, the routing model 502 may be trained to generate, based on an input including a training scenario and a plurality of trajectories generated by the planning models 504*a-c*, an output identifying the best performing one of the planning models 540*a-c*. In some cases, the training of the routing model 502 may include adjusting the parameters (e.g., weights, biases, and/or the like) of the routing model 502 such that the output of the routing model 502 identifies the one of the planning models 504*a-c* whose trajectory has a lowest average displacement error (ADE) relative to the ground-truth trajectory for each training scenario.

At 606, the routing model and the planning models may be applied to generate a trajectory for navigating a vehicle in one or more scenarios. In some example embodiments, upon training, the routing model 502 and the planning models 504*a-c* may be applied to generate, for example, the trajectory 507 for the scenario 505. As will be described in more below, when implementing a two-stage process, each of the trained planning models 504*a-c* may be applied to generate a different candidate trajectory for the scenario 505. The routing model 502 may ingest an input including the candidate trajectories as well as the scenario 505 and generate an output identifying the best performing one of the planning models 504*a-c* for the scenario 505. For example, as noted, the best performing one of the planning models 504*a-c* for the scenario 505 may be the planning model whose candidate trajectories exhibits the lowest average displacement error (ADE). The candidate trajectory generated by the best performing one of the planning models 504*a-c* may be selected for controlling the motion of the vehicle (e.g., an autonomous vehicle such as vehicles 102*a*-102*n*, vehicles 200, and/or the like).

FIG. 6B is a flowchart illustrating an example of a process 650 for ensemble based vehicle motion planning. In some embodiments, one or more of the operations described with respect to process 650 may be performed online (e.g., completely, partially, and/or the like) at the planning system 404 of a vehicle (e.g., an autonomous vehicle such as vehicles 102a-102n, vehicles 200, and/or the like) to generate one or more trajectories for the vehicle to navigate various scenarios encountered by the vehicle (e.g., the trajectory 507 for the scenario 505). Alternatively and/or additionally, one or more operations described with respect to process 650 may be performed offline, for example, at the vehicle-to-infrastructure device 110, the remote AV system 114, the fleet management system 116, and/or the vehicle-to-infrastructure system 118. In some cases, the operations described with respect to the process 650 may implement operation 608 of the process 600, for example, to generate a trajectory for a vehicle to navigate a scenario (e.g., the trajectory 507 for the scenario 505).

At 652, a scenario including a plurality of agent features and/or a plurality of geographic features may be received. As shown in FIG. 5, in some example embodiments, the planning system 404 may receive, for example, from the perception system 402, the localization system 406, and/or the like, the scenario 505 including the agent features 509 (e.g., including those of the vehicle itself) and/or geographical features 511 (e.g., lanes, road features, and/or the like). In some cases, the scenario 505 may be represented as a graph in which one or more lanes present in the environment of the vehicle are represented by a plurality of interconnected nodes. In some cases, the graph may further include one or more additional nodes representative of each of the plurality of agents present in the scenario. The respective features of the agents and lanes may be associated with the corresponding nodes.

At 654, a plurality of candidate trajectories for a vehicle may be generated by at least applying a plurality of planning models including a first planning model to generate a first candidate trajectory based at least on the scenario and a second planning model to generate a second candidate trajectory based on the scenario. As noted, in some example embodiments, the planning models 504a-c may be based on different machine learning architectures. Alternatively and/or additionally, the planning models 504a-c may be trained based on different training data. For example, in some cases, whereas the first planning model 504a determines the trajectory of a vehicle in the scenario 505 based at least on an interaction between a plurality of agents while located relative to one or more lanes present in the scenario 505, the second planning model 504b may determine the trajectory of the vehicle based at least on an interaction between the plurality of agents and the one or more lanes while the plurality of agents are located relative to the one or more lanes. That multiple planning models, including the planning models 504a-c, are applied to determine candidate trajectories for the same scenario 505 enables the planning system 404 to leverage a wider variety of planning models, at least some of which having better performance than others when encountering certain scenarios. For instance, in some cases, the first planning model 504a may be applied to generate a first candidate trajectory for the scenario 505 while the second planning model 504b may be applied to generate a second candidate scenario for the scenario 505 and, in some cases, the third planning model 504c may be applied to also generate a third candidate scenario for the scenario 505. Moreover, in some cases, each of the candidate trajectories may be represented by a graph in which a plurality of interconnected nodes correspond to a plurality of waypoints forming the trajectory.

At 656, a routing model may be applied to select, based at least on the scenario, a trajectory from the plurality of candidate trajectories. In some example embodiments, the routing model 502 may ingest, as input, the scenario 505 and multiple candidate trajectories for the scenario 505 including, for example, the first candidate scenario generated by the first planning model 504a, the second candidate trajectory generated by the second planning model 504b, the third candidate trajectory generated by the third planning model 504c, and/or the like. Furthermore, the routing model 504 may generate, based at least on the scenario 505 and the candidate trajectories, an output identifying the one of the planning models 504a-c having the best performance amongst the planning models 504a-c. For example, in some cases, the routing model 502 may be a graph neural network (GNN) operating on the graphs representative of the scenario 505 and each of the trajectories to determine which one of the planning models 504a-c generated a candidate trajectory having a lowest average displacement error (ADE) compared to the other planning models. In some cases, the output of the routing model 502 may be a one-hot-encoded vector in which the element in the one-hot-encoded vector corresponding to the best performing one of the planning models 504a-c is set to a first value (e.g., "1") while the remaining elements in the one-hot-encoded vector are set to a second value (e.g., "0").

At 658, a motion of the vehicle may be controlled based at least on the selected trajectory. For example, in some cases, the trajectory 507, which may be the candidate trajectory generated by the best performing one of the planning models 504a-c, may be sent to the control system 408 to control the motion of the vehicle. As noted, the trajectory 507 may include a sequence of actions, which may be executed by the control system 408 to navigate the vehicle in the scenario 505.

In some example embodiments, in addition to the two-stage process described in FIGS. 6A-B, the routing model 502 and the planning models 504a-c may implement an end-to-end process in which the routing model 502 and the planning models 504a-c are trained simultaneously to generate, for example, the trajectory 507 for the scenario 505. In some cases, while the planning models 504a-c are trained to generate trajectories for a variety of training scenarios, the routing model 502 may be simultaneously trained to determine whether the performance of the planning models 504a-c satisfies one or more thresholds. For example, the routing model 502 may be trained to determine, based on a training scenario and a corresponding trajectory generated by the first planning model 504a, whether the performance of the first planning model 504a satisfies one or more thresholds (e.g., whether the average displacement error (ADE) of the trajectory generated by the first planning model 504a satisfies one or more thresholds). In the event the performance of the first planning model 504a is determined to satisfy the one or more thresholds, the routing model 502 may then select the trajectory generated by the first planning model 504a as the trajectory for navigating the vehicle in the training scenario. Contrastingly, the routing model 504 may activate the second planning model 504a to generate another trajectory for the same training scenario if the performance of the first planning model 504a fails to satisfy the one or more thresholds.

In this paradigm, the error that is present in the output of the routing model 502 may be reflected by the routing model 502 activating an incorrect one of the planning models 504a-c for a training scenario such that the trajectory that is output by the selected planning model deviates from the ground-truth trajectory associated with the training scenario. Accordingly, training the routing model 502 and the planning models 504a-c may include adjusting the parameters (e.g., weights, biases, and/or the like) of the routing model 502 as well as the parameters (e.g., weights, biases, and/or the like) of the individual planning models 504a-c such that the one of the planning models 504a-c that is activated for each training scenario generates a trajectory whose average displacement error (ADE) relative to the ground-truth trajectory for the training scenario satisfies one or more thresholds.

Upon training and at inference time, the routing model 502 may activate, one at a time, each of the planning models 504a-c to generate a trajectory for the scenario 505 until the routing model 502 determines that the performance one of the planning models 504a-c (e.g., the average displacement error (ADE) of the corresponding trajectory) satisfies one or more thresholds. For instance, in the example shown in FIG. 5, the routing model 502 may first determine, based on the scenario 505 and the first trajectory generated by the first planning model 504a for the scenario 505, whether the performance of the first planning model 504a (e.g., the average displacement error (ADE) of the first trajectory generated by the first planning model 504a) satisfies the one or more thresholds. The routing model 502 may select the first trajectory generated by the first planning model 504a as the trajectory 507 for navigating the vehicle in the scenario 505 if the performance of the first planning model 504a satisfies the one or more thresholds. Alternatively, if the routing model 502 determines that the performance of the first planning model 504a fails to satisfy the one or more thresholds, the routing model 502 may activate the second planning model 504b to generate a second trajectory for the scenario 505. The second trajectory generated by the second planning model 504b may be selected as the trajectory 507 for navigating the vehicle in the scenario 505 if the routing model 502 determines, based on the scenario 505 and the second trajectory, that the performance of the second planning model 504b (e.g., the average displacement error (ADE) of the second trajectory generated by the second planning model 504b) satisfies the one or more thresholds. Otherwise, if the performance of the second planning model 504b fails to satisfy the one or more thresholds, the routing model 502 may activate the third planning model 504c to generate a third trajectory for the scenario 505.

Figure 7A:
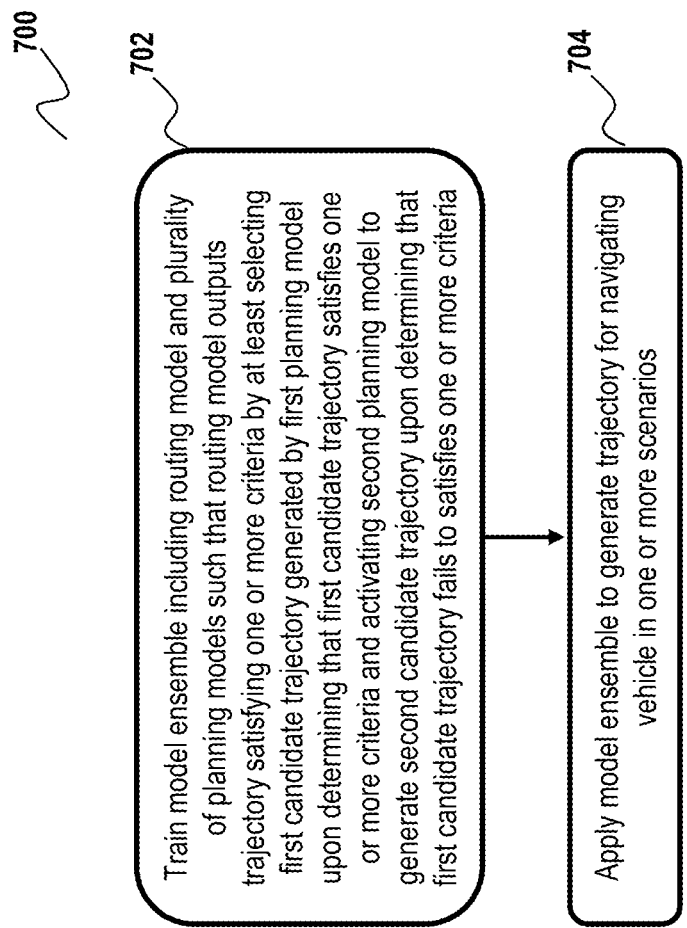
FIG. 7A is a flowchart illustrating another example of a process for ensemble based vehicle motion planning.

Referring now to FIG. 7A, which depicts a flowchart illustrating another example of a process 700 for training a model ensemble to perform vehicle motion planning. In some embodiments, one or more of the operations described with respect to process 700 may be performed (e.g., completely, partially, and/or the like) offline, for example, at the vehicle-to-infrastructure device 110, the remote AV system 114, the fleet management system 116, and/or the vehicle-to-infrastructure system 118, to train a model ensemble including the routing model 502 and the planning models 504a-c. In some cases, upon being trained, at least a portion of the model ensemble including the routing model 502 and the planning models 504a-c may be deployed to the planning system 404 of a vehicle (e.g., an autonomous vehicle such as vehicles 102a-102n, vehicles 200, and/or the like) to generate one or more trajectories for the vehicle to navigate various scenarios encountered by the vehicle (e.g., the trajectory 507 for the scenario 505).

At 702, a model ensemble including a routing model and a plurality of planning models may be trained such the routing model outputs a trajectory satisfying one or more criteria by at least selecting a first candidate trajectory generated by a first planning model upon determining that the first candidate trajectory satisfies the one or more criteria and activating a second planning model to generate a second candidate trajectory upon determining that the first candidate trajectory fails to satisfies the one or more criteria. In some example embodiments, implementing an end-to-end process may include simultaneously training the routing model 502 and the planning models 504a-c. For example, while the planning models 504a-c undergo a training process in which the parameters (e.g., weights, biases, and/or the like) of each of the planning models 504a-c are adjusted to minimize a difference between the trajectories output by each of the planning models 504a-c for various training scenarios and the corresponding ground-truth trajectories for the training scenarios. The planning models 504a-c in the end-to-end process may be based on different machine learning architectures and/or have undergone different training (e.g., different initial parameters, training data, convergence criteria, and/or the like). Moreover, in the end-to-end paradigm, the routing model 502 is simultaneously trained to determine whether the candidate trajectory output by one of the planning models 504 satisfies one or more criteria and activate another one of the planning model 504 if the candidate trajectory fails to satisfy the one or more criteria. For instance, the routing model 502 may ingest, as input, a first candidate trajectory generated by the first planning model 504a and the corresponding training scenario before determining whether an average displacement error (ADE) of the first candidate trajectory satisfies one or more thresholds. In the event the average displacement error (ADE) of the first candidate trajectory fails to satisfy the one or more thresholds, the routing model 502 may activate the second planning model 504b to generate a second candidate trajectory before determining whether the average displacement error (ADE) of the second candidate trajectory satisfies the one or more thresholds.

In some example embodiments, the training of the model ensemble, which includes the routing model 502 and the planning models 504a-c, may include minimizing the error in the output of the model ensemble. For example, once the routing model 502 determines that the candidate trajectory output by one of the planning models 504a-c for a training scenario satisfies the one or more thresholds, that candidate trajectory may be output by the model ensemble. Accordingly, the training of the model ensemble includes adjusting the parameters of the routing model 502 as well as the parameters of the planning models 504a-c to minimize the difference (e.g., the average displacement error (ADE) and/or the like) between the trajectory output by the model ensemble and the ground-truth trajectory for that training scenario. In some cases, these adjustments may reduce the difference (e.g., the average displacement error (ADE) and/or the like) between the trajectory generated by the planning models 504a-c and the ground-truth trajectory. Alternatively and/or additionally, these adjustments may cause the routing model 502 to activate a different one of the planning models 504a-c capable of generating a trajectory that is more similar to the ground-truth trajectory (e.g., having a lower average displacement error (ADE) and/or the like).

At 704, the model ensemble may be applied to generate a trajectory for navigating vehicle in one or more scenarios. In some example embodiments, upon training, the routing model 502 and the planning models 504a-c may be applied to generate, for example, the trajectory 507 for the scenario 505. As will be described in more below, when implementing an end-to-end process, the trained routing model 502 may successively activate one or more of the trained planning models 504a-c to generate one or more candidate trajectories until a candidate trajectory satisfying one or more criteria (e.g., a candidate trajectory whose average displacement error satisfies one or more thresholds) is identified.

Figure 7B:
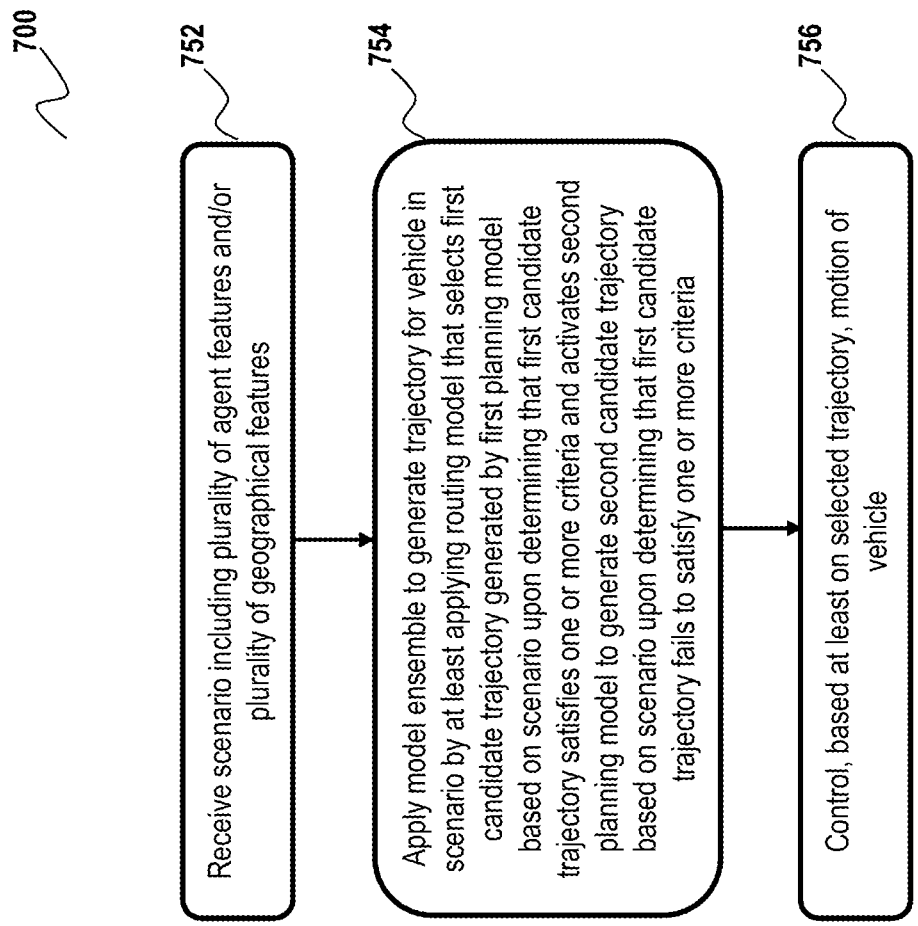
FIG. 7B is a flowchart illustrating another example of a process for ensemble based vehicle motion planning.

FIG. 7B is a flowchart illustrating an example of a process for ensemble based vehicle motion planning. In some embodiments, one or more of the operations described with respect to process 750 may be performed online (e.g., completely, partially, and/or the like) at the planning system 404 of a vehicle (e.g., an autonomous vehicle such as vehicles 102a-102n, vehicles 200, and/or the like) to generate one or more trajectories for the vehicle to navigate various scenarios encountered by the vehicle (e.g., the trajectory 507 for the scenario 505). Alternatively and/or additionally, one or more operations described with respect to process 750 may be performed offline, for example, at the vehicle-to-infrastructure device 110, the remote AV system 114, the fleet management system 116, and/or the vehicle-to-infrastructure system 118. In some cases, the operations described with respect to the process 750 may implement operation 704 of the process 700, for example, to generate a trajectory for a vehicle to navigate a scenario (e.g., the trajectory 507 for the scenario 505).

At 752, a scenario including a plurality of agent features and/or a plurality of geographic features may be received. Referring again to FIG. 5, in some example embodiments, the planning system 404 may receive, for example, from the perception system 402, the localization system 406, and/or the like, the scenario 505 including the agent features 509 (e.g., including those of the vehicle itself) and/or geographical features 511 (e.g., lanes, road features, and/or the like). As noted, in some cases, the scenario 505 may be represented as a graph in which one or more lanes present in the environment of the vehicle are represented by a plurality of interconnected nodes. Moreover, in some instances, the graph may further include one or more additional nodes representative of each of the plurality of agents present in the scenario, with the respective features of the agents and lanes may be associated with the corresponding nodes.

At 754, a model ensemble may be applied to generate a trajectory for a vehicle in the scenario by at least applying a routing model that selects a first candidate trajectory generated by a first planning model based on a scenario of the vehicle upon determining that the first candidate trajectory satisfies one or more criteria and activates a second planning model to generate a second candidate trajectory based on the scenario of the vehicle upon determining that the first candidate trajectory fails to satisfy the one or more criteria. For example, in some cases, the first planning model 504a may be activated to generate a first candidate trajectory for the vehicle in the scenario 505. The routing model 502 may then ingest, as input, the scenario 505 as well as the first candidate trajectory generated by the first planning model 504a for navigating the vehicle in the scenario 505. The routing model 502 may generate an output (e.g., a binary output) indicating whether the first candidate trajectory satisfies the one or more criteria such as having an average displacement error (ADE) satisfying one or more thresholds. In the event the routing model 502 determines that the first candidate trajectory generated by the first planning model 504a does not satisfy the one or more criteria, the trained planning model 502 may activate the second planning model 504b to generate a second candidate trajectory before determining whether the second candidate trajectory satisfies the one or more criteria. In some cases, the routing model 502 may continue to activate another one the planning models 504a-c, such as the third planning model 504c, to generate one or more additional candidate trajectories until a trajectory satisfying the one or more criteria is identified.

At 756, a motion of the vehicle may be controlled based at least on the selected trajectory. For example, in some cases, the trajectory 507, which may be selected by the routing model 502 upon determining that the trajectory 507 satisfies the one or more thresholds, may be sent to the control system 408 to control the motion of the vehicle. As noted, the trajectory 507 may include a sequence of actions, which may be executed by the control system 408 to navigate the vehicle in the scenario 505.

According to some non-limiting embodiments or examples, provided is a method comprising: generating, using at least one processor, a plurality of candidate trajectories for a vehicle in a first scenario, the plurality of trajectory generated by at least applying a first planning model to generate a first trajectory for the vehicle based at least on the first scenario of the vehicle and a second planning model to generate a second trajectory for the vehicle based at least on the first scenario of the vehicle; applying, using the at least one processor, a routing model to select a trajectory from the plurality of candidate trajectories based at least on the first scenario of the vehicle; and controlling, using the at least one processor, a motion of the vehicle based at least on the selected trajectory.

According to some non-limiting embodiments or examples, provided is a method comprising: applying, using at least one processor, a model ensemble to generate a trajectory for a vehicle, the model ensemble comprising a plurality of planning models and a routing model, wherein the plurality of planning models comprises a first planning model that generates a first candidate trajectory for the vehicle based at least on a first scenario of the vehicle, wherein the routing model selects the first candidate trajectory output by the first planning model as the trajectory for the vehicle based on determining that the first candidate trajectory satisfies one or more criteria, and wherein the routing model applies a second planning model of the plurality of planning models to generate a second candidate trajectory for the vehicle based on first the scenario of the vehicle in response to determining that the first candidate trajectory output by the first planning model fails to satisfy the one or more criteria; and controlling, using the at least one processor, a motion of the vehicle based at least on the trajectory generated by the model ensemble.

According to some non-limiting embodiments or examples, provided is a system comprising: at least one data processor; and at least one memory storing instructions thereon that, when executed by the at least one processor, result in operations comprising: generating a plurality of candidate trajectories for a vehicle in a first scenario, the plurality of trajectory generated by at least applying a first planning model to generate a first trajectory for the vehicle based at least on the first scenario of the vehicle and a second planning model to generate a second trajectory for the vehicle based at least on the first scenario of the vehicle; applying a routing model to select a trajectory from the plurality of candidate trajectories based at least on the first scenario of the vehicle; and controlling a motion of the vehicle based at least on the selected trajectory.

According to some non-limiting embodiments or examples, provided is a system comprising: at least one data processor; and at least one memory storing instructions thereon that, when executed by the at least one processor, result in operations comprising: applying a model ensemble to generate a trajectory for a vehicle, the model ensemble comprising a plurality of planning models and a routing model, wherein the plurality of planning models comprises a first planning model that generates a first candidate trajectory for the vehicle based at least on a first scenario of the vehicle, wherein the routing model selects the first candidate trajectory output by the first planning model as the trajectory for the vehicle based on determining that the first candidate trajectory satisfies one or more criteria, and wherein the routing model applies a second planning model of the plurality of planning models to generate a second candidate trajectory for the vehicle based on first the scenario of the vehicle in response to determining that the first candidate trajectory output by the first planning model fails to satisfy the one or more criteria; and controlling a motion of the vehicle based at least on the trajectory generated by the model ensemble.

According to some non-limiting embodiments or examples, provided is at least one non-transitory computer-readable medium comprising one or more instructions that, when executed by at least one processor, cause the at least one processor to perform operations comprising: generating a plurality of candidate trajectories for a vehicle in a first scenario, the plurality of trajectory generated by at least applying a first planning model to generate a first trajectory for the vehicle based at least on the first scenario of the vehicle and a second planning model to generate a second trajectory for the vehicle based at least on the first scenario of the vehicle; applying a routing model to select a trajectory from the plurality of candidate trajectories based at least on the first scenario of the vehicle; and controlling a motion of the vehicle based at least on the selected trajectory.

According to some non-limiting embodiments or examples, provided is at least one non-transitory computer-readable medium comprising one or more instructions that, when executed by at least one processor, cause the at least one processor to perform operations comprising: applying a model ensemble to generate a trajectory for a vehicle, the model ensemble comprising a plurality of planning models and a routing model, wherein the plurality of planning models comprises a first planning model that generates a first candidate trajectory for the vehicle based at least on a first scenario of the vehicle, wherein the routing model selects the first candidate trajectory output by the first planning model as the trajectory for the vehicle based on determining that the first candidate trajectory satisfies one or more criteria, and wherein the routing model applies a second planning model of the plurality of planning models to generate a second candidate trajectory for the vehicle based on first the scenario of the vehicle in response to determining that the first candidate trajectory output by the first planning model fails to satisfy the one or more criteria; and controlling a motion of the vehicle based at least on the trajectory generated by the model ensemble.

Further non-limiting aspects or embodiments are set forth in the following numbered clauses:

Clause 1: A method, comprising: generating, using at least one processor, a plurality of candidate trajectories for a vehicle in a first scenario, the plurality of trajectory generated by at least applying a first planning model to generate a first trajectory for the vehicle based at least on the first scenario of the vehicle and a second planning model to generate a second trajectory for the vehicle based at least on the first scenario of the vehicle; applying, using the at least one processor, a routing model to select a trajectory from the plurality of candidate trajectories based at least on the first scenario of the vehicle; and controlling, using the at least one processor, a motion of the vehicle based at least on the selected trajectory.

Clause 2: The method of clause 1, wherein the first scenario of the vehicle comprises a plurality of agents located in an environment that the vehicle is operating in and one or more lanes, the plurality of agents comprising the vehicle.

Clause 3: The method of clause 2, wherein the first scenario comprises a graph representative of a plurality of features associated with the plurality of agents and the one or more lanes.

Clause 4: The method of clause 2, wherein the first planning model determines the first trajectory of the vehicle based at least on an interaction between the plurality of agents while located relative to the one or more lanes present in the first scenario.

Clause 5: The method of clause 2, wherein the second planning model determines the second trajectory of the vehicle based at least an interaction between the plurality of agents while located relative to the one or more lanes present in the first scenario.

Clause 6: The method of any of clauses 1-5, wherein the first planning model is based on first machine learning model, and wherein the second planning model is based on a machine learning model that is different from the first machine learning model.

Clause 7: The method of any of clauses 1-6, wherein the first planning model is based on a machine learning model trained using a first training set, and wherein the second planning model is based on a machine learning model trained using a second training set that is different from the first training set.

Clause 8: The method of any of clauses 1-7, wherein the first planning model is based on a machine learning model initialized with a first set of parameters, and wherein the second planning model is based on a machine learning model initialized with a second set of parameters that is different from the first set of parameters.

Clause 9: The method of any of clauses 1-8, further comprising: applying the first planning model to generate a third trajectory for the vehicle in a second scenario; applying the second planning model to generate a fourth trajectory for the vehicle in the second scenario; identifying the third trajectory as a correct trajectory for navigating the second scenario; and generating a training set for training the routing model, the training set being generated to include the second scenario and a ground truth output identifying the first planning model as a best performing planning model for the second scenario.

Clause 10: The method of clause 9, further comprising: training the first planning model prior to applying the first planning model to generate the first trajectory and the third trajectory; and training the second planning model prior to applying the second planning model to generate the fourth trajectory.

Clause 11: The method of clause 9, wherein the third trajectory is identified as the correct trajectory for navigating the second scenario based at least on the third trajectory having a lower average displacement error (ADE) relative to a ground-truth trajectory for the second scenario than the fourth trajectory.

Clause 12: The method of any of clauses 1-11, wherein at least one of the first planning model, the second planning model, and the routing model is a graph neural network (GNN) or a transformer model.

Clause 13: The method of any of clauses 1-12, wherein the routing model selects the trajectory from the plurality of trajectories by at least determining a performance metric for each trajectory of the plurality of trajectories and selecting the trajectory based at least on a performance metric of the trajectory satisfying one or more thresholds.

Clause 14: The method of clause 13, wherein the performance metric is an average displacement error (ADE).

Clause 15: The method of any of clauses 1-14, wherein the plurality of trajectories is further generated by at least applying a third planning model to generate a third trajectory for the vehicle based at least on the first scenario of the vehicle.

Clause 16: A method, comprising: applying, using at least one processor, a model ensemble to generate a trajectory for a vehicle, the model ensemble comprising a plurality of planning models and a routing model, wherein the plurality of planning models comprises a first planning model that generates a first candidate trajectory for the vehicle based at least on a first scenario of the vehicle, wherein the routing model selects the first candidate trajectory output by the first planning model as the trajectory for the vehicle based on determining that the first candidate trajectory satisfies one or more criteria, and wherein the routing model applies a second planning model of the plurality of planning models to generate a second candidate trajectory for the vehicle based on first the scenario of the vehicle in response to determining that the first candidate trajectory output by the first planning model fails to satisfy the one or more criteria; and controlling, using the at least one processor, a motion of the vehicle based at least on the trajectory generated by the model ensemble.

Clause 17: The method of clause 16, wherein the first planning model is implemented with a first machine learning model, and wherein the second planning model is implemented with a machine learning model that is different from the first machine learning model.

Clause 18: The method of clause 16 or clause 17, wherein the first planning model is implemented with a machine learning model trained based on a first training set, and wherein the second planning model is implemented with the machine learning model trained based a second training set that is different from the first training set.

Clause 19: The method of any of clauses 16-18, wherein the first planning model is implemented with a machine learning model initialized with a first set of parameters, and wherein the second planning model is implemented with the machine learning model initialized with a second set of parameters that is different from the first set of parameters.

Clause 20: The method of any of clauses 16-19, wherein the routing model further selects the second trajectory output by the second planning model as the trajectory for the vehicle upon determining that the second trajectory satisfies the one or more criteria, and wherein the model applies a third planning model of the plurality of planning models to generate a third trajectory for the vehicle based at least on the first scenario of the vehicle upon determining that the second trajectory output by the second planning model fails to satisfy the one or more criteria.

Clause 21: The method of any of clauses 16-20, further comprising: training, using the at least one data processor and based at least on a training set, the model ensemble, the training set including a second scenario and a ground truth trajectory corresponding to a correct trajectory for navigating the second scenario, the training of the model ensemble includes training the plurality of planning models along with the routing model to minimize a difference between an output of the model ensemble and the ground truth trajectory associated with the second scenario.

Clause 22: The method of any of clauses 16-21, wherein the scenario of the vehicle comprises a plurality of agents including the vehicle and one or more lanes.

Clause 23: The method of clause 22, wherein the first scenario of the vehicle comprises a graph representative of a plurality of features associated with the plurality of agents and the one or more lanes.

Clause 24: The method of any of clauses 16-23, wherein the first planning model determines the first trajectory of the vehicle based at least on an interaction between a plurality of agents and one or more lanes present in the first scenario of the vehicle while the plurality of agents are located relative to the one or more lanes.

Clause 25: The method of any of clauses 16-24, wherein the second planning model determines the second trajectory of the vehicle based at least an interaction between a plurality of agents present in the first scenario of the vehicle while the plurality of agents are located relative to one or more lanes present in the first scenario of the vehicle.

Clause 26: The method of any of clauses 16-25, wherein at least one of the plurality of planning models and the routing model is a graph neural network (GNN) or a transformer model.

Clause 27: The method of any of clauses 16-26, wherein the one or more criteria include an average displacement error (ADE) of the first candidate trajectory satisfying one or more threshold values.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
generating, using at least one processor, a plurality of candidate trajectories comprising a first trajectory and a second trajectory for a vehicle in a first scenario, the plurality of candidate trajectories generated by at least activating a first planning model by a routing model to generate the first trajectory for the vehicle based at least on the first scenario of the vehicle and activating a second planning model by the routing model to generate the second trajectory for the vehicle based at least on the first scenario of the vehicle;
applying, using the at least one processor, the routing model to select a trajectory from the plurality of candidate trajectories based at least on the first scenario of the vehicle, wherein a model ensemble comprising the first planning model, the second planning model, and the routing model is trained based at least on a training set, the training set comprising a second scenario and a ground truth trajectory corresponding to a correct trajectory for navigating the second scenario, and wherein the training of the model ensemble includes training the plurality of planning models along with the routing model to minimize a difference between an output of the model ensemble and the ground truth trajectory associated with the second scenario; and controlling, using the at least one processor, a motion of the vehicle based at least on the selected trajectory.

2. The method of claim 1, wherein the first scenario of the vehicle comprises a plurality of agents located in an environment that the vehicle is operating in and one or more lanes, the plurality of agents comprising the vehicle.

3. The method of claim 2, wherein the first scenario comprises a graph representative of a plurality of features associated with the plurality of agents and the one or more lanes.

4. The method of claim 2, wherein the first planning model determines the first trajectory of the vehicle based at least on an interaction between the plurality of agents while located relative to the one or more lanes present in the first scenario.

5. The method of claim 2, wherein the second planning model determines the second trajectory of the vehicle based at least an interaction between the plurality of agents while located relative to the one or more lanes present in the first scenario.

6. The method of claim 1, wherein the first planning model is based on a first machine learning model, and wherein the second planning model is based on a machine learning model that is different from the first machine learning model.

7. The method of claim 1, wherein the first planning model is based on a machine learning model trained using a first training set, and wherein the second planning model is based on a machine learning model trained using a second training set that is different from the first training set.

8. The method of claim 1, wherein the first planning model is based on a machine learning model initialized with a first set of parameters, and wherein the second planning model is based on a machine learning model initialized with a second set of parameters that is different from the first set of parameters.

9. The method of claim 1, further comprising:
applying the first planning model to generate a third trajectory for the vehicle in a second scenario;
applying the second planning model to generate a fourth trajectory for the vehicle in the second scenario;
identifying the third trajectory as a correct trajectory for navigating the second scenario; and
generating a training set for training the routing model, the training set being generated to include the second scenario and a ground truth output identifying the first planning model as a best performing planning model for the second scenario.

10. The method of claim 9, further comprising:
training the first planning model prior to applying the first planning model to generate the first trajectory and the third trajectory; and
training the second planning model prior to applying the second planning model to generate the fourth trajectory.

11. The method of claim 9, wherein the third trajectory is identified as the correct trajectory for navigating the second scenario based at least on the third trajectory having a lower average displacement error (ADE) relative to a ground-truth trajectory for the second scenario than the fourth trajectory.

12. The method of claim 1, wherein at least one of the first planning model, the second planning model, and the routing model is a graph neural network (GNN) or a transformer model.

13. The method of claim 1, wherein the routing model selects the trajectory from the plurality of candidate trajectories by at least determining a performance metric associated with a respective trajectory of the plurality of candidate trajectories and selecting the trajectory based at least on a performance metric of the respective trajectory satisfying one or more thresholds.

14. The method of claim 13, wherein the performance metric is an average displacement error (ADE).

15. The method of claim 1, wherein the plurality of candidate trajectories is further generated by at least applying a third planning model to generate a third trajectory for the vehicle based at least on the first scenario of the vehicle.

16. A method, comprising:
applying, using at least one processor, a model ensemble to generate a trajectory for a vehicle, the model ensemble comprising a plurality of planning models and a routing model, wherein the plurality of planning models comprises a first planning model that generates a first candidate trajectory for the vehicle based at least on a first scenario of the vehicle, wherein the routing model selects the first candidate trajectory output by the first planning model as the trajectory for the vehicle based on determining that the first candidate trajectory satisfies one or more criteria, and wherein the routing model activates a second planning model of the plurality of planning models to generate a second candidate trajectory for the vehicle based on first the scenario of the vehicle in response to determining that the first candidate trajectory output by the first planning model fails to satisfy the one or more criteria, wherein the model ensemble is trained based at least on a training set, the training set comprising a second scenario and a ground truth trajectory corresponding to a correct trajectory for navigating the second scenario, and wherein the training of the model ensemble includes training the plurality of planning models along with the routing model to minimize a difference between an output of the model ensemble and the ground truth trajectory associated with the second scenario; and
controlling, using the at least one processor, a motion of the vehicle based at least on the trajectory generated by the model ensemble.

17. The method of claim 16, wherein the first planning model is implemented with a first machine learning model, and wherein the second planning model is implemented with a machine learning model that is different from the first machine learning model.

18. The method of claim 16, wherein the first planning model is implemented with a machine learning model trained based on a first training set, and wherein the second planning model is implemented with the machine learning model trained based a second training set that is different from the first training set.

19. The method of claim 16, wherein the first planning model is implemented with a machine learning model initialized with a first set of parameters, and wherein the second planning model is implemented with the machine learning model initialized with a second set of parameters that is different from the first set of parameters.

20. The method of claim 16, wherein the routing model further selects the second candidate trajectory output by the second planning model as the trajectory for the vehicle upon determining that the second candidate trajectory satisfies the one or more criteria, and wherein the model ensemble applies a third planning model of the plurality of planning models to generate a third trajectory for the vehicle based at least on the first scenario of the vehicle upon determining that the second candidate trajectory output by the second planning model fails to satisfy the one or more criteria.

21. The method of claim 16, wherein the first scenario of the vehicle comprises a plurality of agents including the vehicle and one or more lanes.

22. The method of claim 21, wherein the first scenario of the vehicle comprises a graph representative of a plurality of features associated with the plurality of agents and the one or more lanes.

23. The method of claim 16, wherein the first planning model determines the first candidate trajectory of the vehicle based at least on an interaction between a plurality of agents and one or more lanes present in the first scenario of the vehicle while the plurality of agents are located relative to the one or more lanes.

24. The method of claim 16, wherein the second planning model determines the second candidate trajectory of the vehicle based at least an interaction between a plurality of agents present in the first scenario of the vehicle while the plurality of agents are located relative to one or more lanes present in the first scenario of the vehicle.

25. The method of claim 16, wherein at least one of the plurality of planning models and the routing model is a graph neural network (GNN) or a transformer model.

26. The method of claim 16, wherein the one or more criteria include an average displacement error (ADE) of the first candidate trajectory satisfying one or more threshold values.

27. A system comprising:
at least one processor; and
at least one memory storing instructions thereon that, when executed by the at least one processor, result in operations comprising:
generating a plurality of candidate trajectories comprising a first trajectory and a second trajectory for a vehicle in a first scenario, the plurality of candidate trajectories generated by at least activating a first planning model by a routing model to generate a first trajectory for the vehicle based at least on the first scenario of the vehicle and activating a second planning model by the routing model to generate the second trajectory for the vehicle based at least on the first scenario of the vehicle;
applying the routing model to select a trajectory from the plurality of candidate trajectories based at least on the first scenario of the vehicle, wherein a model ensemble comprising the first planning model, the second planning model, and the routing model is trained based at least on a training set, the training set comprising a second scenario and a ground truth trajectory corresponding to a correct trajectory for navigating the second scenario, and wherein the training of the model ensemble includes training the plurality of planning models along with the routing model to minimize a difference between an output of the model ensemble and the ground truth trajectory associated with the second scenario; and controlling a motion of the vehicle based at least on the selected trajectory.

28. A system comprising:

at least one processor; and at least one memory storing instructions thereon that, when executed by the at least one processor, result in operations comprising:

applying a model ensemble to generate a trajectory for a vehicle, the model ensemble comprising a plurality of planning models and a routing model, wherein the plurality of planning models comprises a first planning model that generates a first candidate trajectory for the vehicle based at least on a first scenario of the vehicle, wherein the routing model selects the first candidate trajectory output by the first planning model as the trajectory for the vehicle based on determining that the first candidate trajectory satisfies one or more criteria, and wherein the routing model activates a second planning model of the plurality of planning models to generate a second candidate trajectory for the vehicle based on first the scenario of the vehicle in response to determining that the first candidate trajectory output by the first planning model fails to satisfy the one or more criteria, wherein the model ensemble is trained based at least on a training set, the training set comprising a second scenario and a ground truth trajectory corresponding to a correct trajectory for navigating the second scenario, and wherein the training of the model ensemble includes training the plurality of planning models along with the routing model to minimize a difference between an output of the model ensemble and the ground truth trajectory associated with the second scenario; and controlling a motion of the vehicle based at least on the trajectory generated by the model ensemble.

* * * * *